United States Patent [19]

Dang et al.

[11] Patent Number: 4,916,329

[45] Date of Patent: Apr. 10, 1990

[54] UNINTERRUPTIBLE POWER SUPPLY

[75] Inventors: Gurcharn S. Dang, Escondido; Casey Kuzara, San Diego, both of Calif.

[73] Assignee: Square D Company, Palatine, Ill.

[21] Appl. No.: 104,725

[22] Filed: Oct. 5, 1987

[51] Int. Cl.[4] .............................................. H02J 9/00
[52] U.S. Cl. ...................................... 307/66; 307/83; 307/87; 363/126; 323/344
[58] Field of Search ....................... 307/64, 66, 82, 83, 307/84, 85, 86, 87; 323/258, 343, 340; 363/126

[56] References Cited

U.S. PATENT DOCUMENTS

| | | | |
|---|---|---|---|
| 2,417,754 | 3/1947 | Hibbard | 323/344 |
| 3,445,753 | 5/1969 | Maxwell | 323/344 X |
| 3,614,595 | 10/1971 | Paulden | 323/344 |
| 3,745,365 | 7/1973 | Spreadburg et al. | 307/83 X |
| 3,921,053 | 11/1975 | Hekimian | 363/126 X |
| 4,564,747 | 1/1986 | Charych | 307/66 |
| 4,591,779 | 5/1986 | Carpenter et al. | 323/340 X |
| 4,673,825 | 6/1987 | Raddi et al. | 307/66 |
| 4,692,686 | 9/1987 | Thomas | 323/344 X |
| 4,748,341 | 5/1988 | Gupta | 307/66 X |

Primary Examiner—William M. Shoop, Jr.
Assistant Examiner—Paul Ip
Attorney, Agent, or Firm—Michael J. Femal; Lawrence J. Bassuk

[57] ABSTRACT

An uninterruptible power supply device uses a transformer with a first primary winding and secondary winding tightly coupled to one another to transmit AC input electrical power to a voltage sensitive load. A series regulator switches taps in the first primary to keep the load output voltage within certain limits during minor variations in the AC input voltage. A standby inverter supplies standby power to the load after a loss or large variation in the AC input voltage by driving PWM pulses into a secondary primary winding of the transformer. The transformer loosely couples the second primary winding to the secondary winding to aid in synthesizing the output sinusoidal wave from the PWM pulses. The regulator opens all of the taps to prevent the inverter from supplying power to the AC input. A voltage monitor continuously senses the AC waveform of an AC sample signal produced from the output load voltage in the normal mode and from the AC input voltage in the standby mode to determine forward and reverse transfers between modes. A clipped AC sample signal detector inhibits transfer in high peak current conditions, and a digital phase-locked loop circuit operating at a fraction of the AC input frequency synchronizes the phase of a precision sine wave signal with the phase of the AC input voltage.

68 Claims, 26 Drawing Sheets

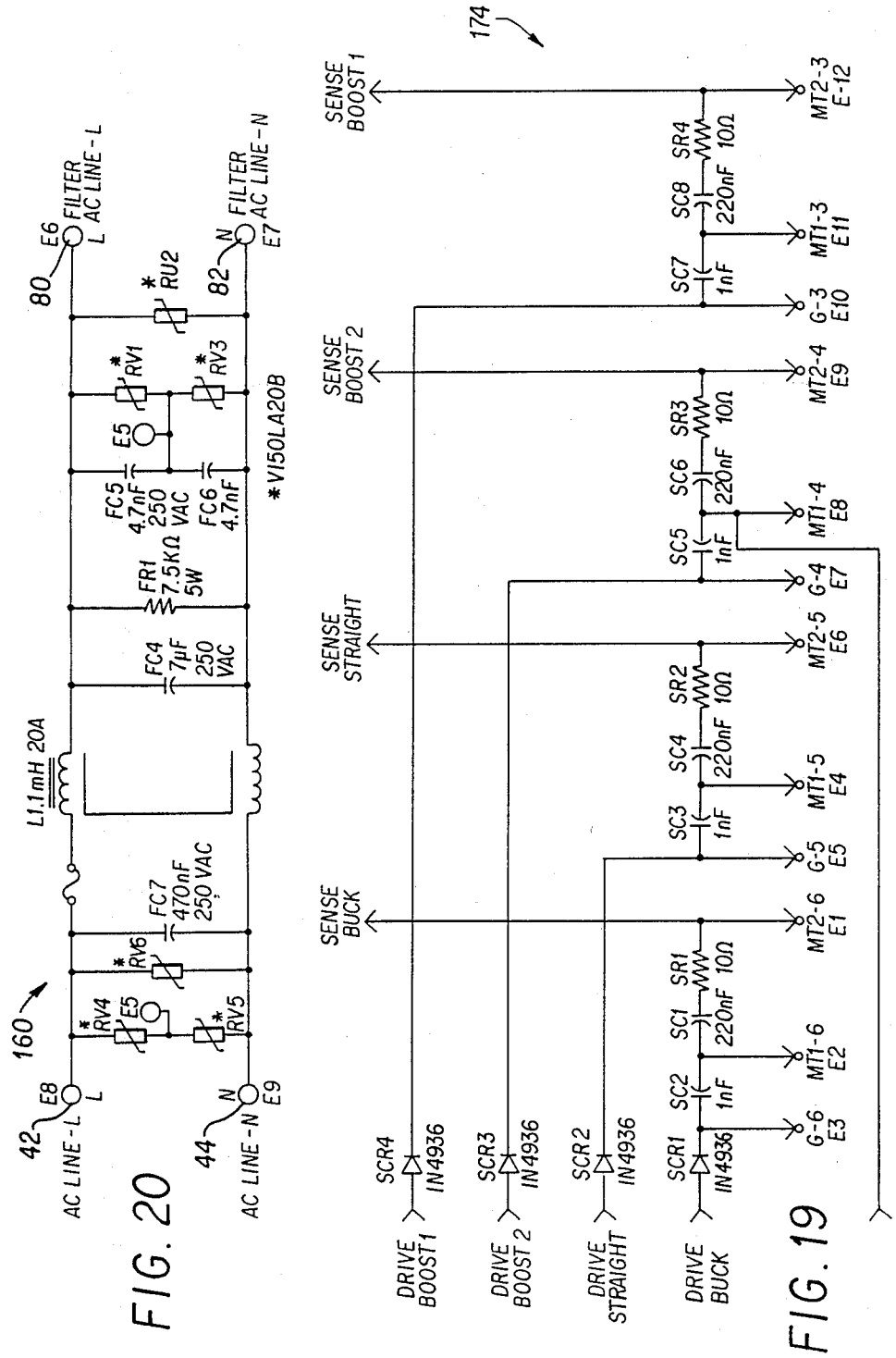

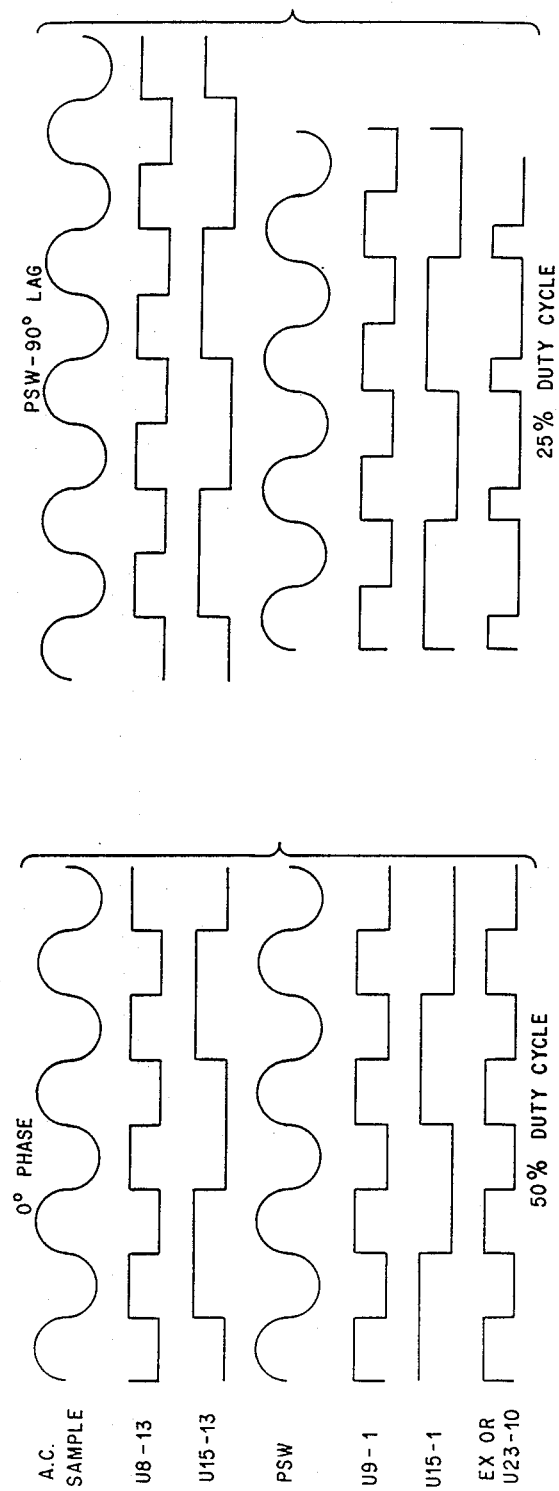
FIG. 26
FIG. 25
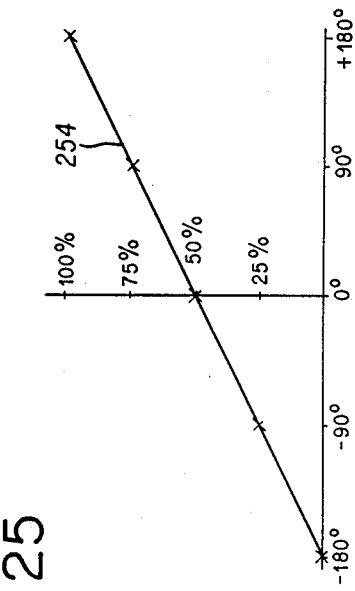
FIG. 30

UNINTERRUPTIBLE POWER SUPPLY

BACKGROUND OF THE INVENTION

This invention relates generally to power supply devices transmitting AC input electrical power to loads sensitive to loss or large variations in the AC input supplied electrical power. It particularly relates to such devices supplying standby electrical power to sensitive loads upon loss or large variation in the AC input electrical source. These devices generally are described as uninterruptible power supplies or UPS devices.

A UPS device generally operates in one of two modes: normal and standby In the normal mode, the UPS device transmits electrical power from the AC input supply to the sensitive load while measuring the AC input source for losses or large variations. Upon measuring or determining a loss or a large variation in the transmitted electrical voltage greater than the load can withstand, the UPS device forward transfers to the standby mode to supply electrical power to the load from a battery. This maintains the supply of electrical power to the sensitive load for continued operation of the load or for the load to turn off in an orderly sequence. In the standby mode, the device measures the AC input source of electrical power for reverse transferring to the normal mode upon proper return of the AC input source.

The load could be such as a desk top computer that needs electrical power to retain its operating data and programs A sudden over or under voltage or complete loss of power can effect a loss of data that is expensive to re-assemble or, at least, an annoying interruption and restarting of a software program. Other devices such as medical life support or life monitoring devices likewise need constant supplies of electrical power for proper operation. These same general principles of normal and standby mode operation and forward and reverse transfer apply to large and small loads and large and small UPS devices One known on-line manner of effecting a UPS device constantly rectifies the AC input power to DC and then inverts the DC to AC to within closely regulated voltage limits. Some of the intermediate DC power maintains the charge in a battery that supplies the electrical power upon an under voltage or loss of power from the line source. Over voltages become absorbed in the intermediate DC stages of the UPS device. This kind of operation continuously rectifies and inverts, with attendant power losses, the AC input electrical power that normally occurs within acceptable limits. This continuous operation of the rectifier and inverter components in the normal transmission of line electrical power ages those components much more quickly than if they were operated intermittently only in the standby mode, raising reliability problems Also the rectifier and inverter components can produce loud, continuous audible noise.

A second known switched manner of effecting a UPS device uses a relay or other mechanical switching device to connect the AC input source to the load in normal transmission of electrical power and to disconnect the AC input from the load and connect a battery powered standby inverter to the load upon loss or large variation of the AC input electrical power. This type of system, in the normal mode, fails to provide the sensitive load with isolation from potentially harmful AC input source events such as voltage spikes or surges or to provide the load with voltage regulation. Transfer between the two modes occurs slowly and with unwanted electrical noise because of the mechanical limitations of the switch. Common-mode and normal mode noise attenuation usually is minimal.

The last or triport known manner of effecting a UPS device uses a three port ferroresonant transformer. Normal transmission of electrical power occurs loosely from a first primary winding to a secondary winding through a high reactive impedance of the transformer. The AC input connects to the first primary winding while the load connects to the secondary winding. In standby mode, the utility connection opens and standby electrical power becomes loosely supplied from a battery through an inverter to a second primary winding of the transformer and therefrom through the high reactive impedance of the transformer to the secondary winding and the load. The two primary and one secondary windings form the three ports of this type of UPS device.

While providing voltage regulation, the ferroresonant transformer is heavy and inefficiently transmits power to the load while causing a high output impedance. Transfer between modes occurs quickly, but special timing is needed to synchronize the inverter phase with the output phase to avoid producing output voltage spikes, especially with highly capacitive loads.

These three known types of systems separately embody several previously known UPS device characteristics that until now could not have been provided in one UPS device. These include efficient transmission of line power in a normal mode of operation, light weight, inherent reliability of circuit arrangement and component usage, low output impedance especially in the normal mode, regulation of the AC input voltage transmitted to the load and fast transfer between normal and standby modes with minimal or an absence of electrical noise at transfer. Further desirable features include attenuation of common-mode and normal-mode AC input source noise and isolation of the load from the AC input source.

Known output voltage regulation to the load for AC input voltage variations occurs in an on-line UPS device by regulating the AC voltages produced by the output inverter. See for example U.S. Pat. No. 4,410,935 to Dang. This regulation is substantially non-existent in switched devices and triport devices provide voltage regulation by controlling the magnetic saturation of the iron core of the ferroresonant transfer. See for example U.S. Pat. No. 4,400,624 and U.S. Pat. No. 4,475, 047.

Known transformers used in UPS devices consist mainly of ferroresonant, high reactive impedance transformers used in triport devices. These transformers insert magnetic shunts between the first primary winding and the secondary winding and between the second primary winding and the secondary winding. Such an arrangement provides for constant operation of the standby inverter at a particular phase relative to the AC input phase for the standby inverter to act as a rectifier of electrical power from the transformer to charge the battery. By changing the standby inverter phase, this circuit supplies electrical power to the load through the transformer, after the AC input becomes disconnected from the first primary winding. See for examples U.S. Pat. No. 4,475,047; U.S. Pat. No. 4,400,624; U.S. Pat. No. 4,238,691 and U.S. Pat. No. 4,238,688.

Alternatively, the high reactive impedance transformer can have the two shunts dividing the iron core into three sections with the core carrying the output secondary winding on a terminal section and the first and second primary windings on the other two sections. See U.S. Pat. No. 4,556,802. This arrangement of windings supposedly provides for parallel supply of power by the standby inverter circuit during normal mode operation and the elimination of a switch to disconnect the line source upon transfer to standby mode operation.

Ferroresonant transformers inherently are large and heavy and poorly or loosely couple electrical power from input to output. This is used to advantage in previous UPS devices to obtain AC input voltage regulation but remains an overall disadvantage from a device system view. Tightly coupled power or isolation transformers are much smaller, lighter and efficient, but additional circuits must be used for regulation. Further, most standby inverters synthesize the desired 60 hertz AC sinusoidal output waveform by pulse width modulation (PWM) techniques driven through an inductor. The loose coupling of a ferroresonant transformer readily furnishes this desired inductance. A power transformer does not supply this inductance and requires an additional inductor in the secondary output circuit to integrate the PWM signal and obtain the sinusoidal waveform output.

Known UPS devices of the switched or triport type require some phase locked loop circuit to synchronize the phase of the standby power with that of the line source to continue smooth transmission or supply of electrical power to the load at forward transfer from normal to standby mode and at reverse transfer from standby to normal load. Phase synchronization avoids producing voltage spikes to the load and the UPS device supplying or absorbing instantaneous quantities of power at transfer.

Many such phase-locked loop circuits are known. For example U.S. Pat. No. 4,638,176 discloses phase-locked loop 70, in a UPS device, producing a square wave reference at an undisclosed phase-shifted angle.

What is desired thus is a UPS device that efficiently and with regulation transmits AC input electrical power to a sensitive load during normal operation and that reliably supplies the load with standby electrical power of the same AC phase upon loss or large variation of the AC input source. The UPS device should isolate the load from the AC input, attenuate common-mode and normal-mode input noise, provide a low output impedance and transfer between modes without electrical noise while continuously supplying or transmitting electrical power to the load.

SUMMARY OF THE INVENTION

The UPS device of the invention achieves these and other advantages by tightly coupling electrical power through a transformer from the AC input to the load in normal mode operation and by loosely coupling electrical power through the transformer from the standby inverter to the load in standby mode operation. A regulator in series between the AC input source and tightly coupled portion of a transformer maintains the output voltage to the load within certain narrow limits and maintains the UPS device in the normal mode during minor variations in the voltage from the AC input source. The regulator acts by connecting the AC input source to different transformer winding taps in the normal mode and by opening the AC input connection in the standby mode.

This circuit arrangement achieves a highly efficient, reliable and light weight transmission of electrical power from AC input source to load during normal line conditions and the maintenance of the UPS device in the normal mode during minor voltage variations of the line. The loose coupling of the standby inverter to the load facilitates using PWM techniques, with the high reactive impedance of the loose coupling forming the necessary inductance to smooth the PWM pulses into a sinusoidal output waveform. The regulator opening the connection to the line in the standby mode prevents the standby inverter from supplying electrical power to the AC input source. The load sees a low impedance from the UPS device in the normal and standby modes and transfer between modes occurs quickly.

The UPS device of the invention further furnishes a voltage monitor that indicates that the device should forward or reverse transfer between modes. The monitor compares an AC sample signal to phase synchronized AC high and low voltage limit signals to determine when a transfer should take place. An electronic switch and control circuit form the AC sample signal from the load output voltage in the normal mode and from the AC input source voltage in the standby mode. A novel clipped AC sample signal detector associated with the voltage monitor inhibits transfer between modes when a heavy load current drawn from the finite impedance of the line or UPS device limits the crest voltage of the AC sample signal. Lastly, a simple digital phase detector in a phase locked loop circuit keeps a precision sine wave reference signal closely synchronized with the phase of the AC input electrical voltage in the normal mode, and in the standby mode re-synchronizes the precision sine wave reference signal with the phase of the AC input voltage returning to within limits.

In particular, the transformer of the UPS device of the invention comprises an iron core carrying a first primary winding and a secondary winding wound concentrically on one another to obtain the tight coupling and desired efficient power transfer therebetween. The AC input couples to the first primary through the known series regulator, which selectively connects the AC input to any one of four different taps of the first primary winding. These switched taps produce through the transformer a buck loop, a straight loop, a boost-1 loop and a boost-2 loop. The load connects to the secondary winding and the regulator, by switching between the four tap loops, attempts to keep the output voltage at rated output voltage, +6 and −8 percentage.

The transformer core also carries a second primary winding adjacent the concentric first primary and secondary windings, that is wound to be tall and thin, and magnetically loosely coupled to the first primary and secondary windings. The standby inverter connects to and drives known PWM pluses into this second primary winding to supply AC electrical power to the load through the low pass filtering of the high reactive impedance of the loose coupling to the secondary winding and a capacitor connected across the secondary winding.

Upon the voltage monitor of the UPS device determining a loss or large variation in the AC input source voltage the device forward transfers to standby mode. The regulator removes its signal to the one closed tap switch in order to disconnect the AC input. The standby inventer, which the phase locked loop has kept in phase with the output voltage, starts supplying power to the second primary winding when the regulator removes its switch signal and continues supplying power for the duration of the standby mode operation or until battery power becomes exhausted. Before total battery exhaustion, the UPS device produces a signal that can be connected to the load to indicate an impending shutdown.

Upon the voltage monitor determining that the AC input source voltage has returned to within operable limits, the UPS device reverse transfers to the normal mode: first, the phase-locked loop phase shifts the inventer to match that of the line source, and then the regulator becomes enabled. Upon the regulator signalling to turn on one tap switch, the inventer stops driving PWM pulses into the second primary and the UPS device returns to transmitting electrical power from the AC input to the load. Substantially, in both forward and reverse transfer there occurs a "make before break" sequence of turning on and off the line and inventer to the load.

The voltage monitor receives the precision sine wave signal produced in the phase-locked loop and generates an AC high voltage limit signal and AC low voltage limit signal. The monitor flattens the zero crossing point of each limit signal decrease comparator sensitivity at zero crossing points. The limit signals each pass to one of two different analog comparators that also receive the AC sample signal. While the AC sample signal remains within the AC limits represented by the limits signals, the comparators produce square wave signals in phase with the precision sink wave signal. The comparators produce square wave signals out of phase with the precision sine wave signal when the AC sample signal exceeds either one of the limit signals. The comparator signals become compared in phase to the precision sine wave signal in two separate digital gates that produce a high-limit logic signal indicating the presence or absence of an over-voltage condition and that produce a low-limit logic signal indicating the presence or absence of an under-voltage condition. The high and low-limit logic signals pass through delay timers and eventually through desired logic to effect or enable a transfer between normal and standby modes.

The voltage monitor thus senses the voltage of the AC sample signal continuously in its sinusoidal excursions and delays for desired periods the decision to transfer between modes. The delays compensate for voltage spikes and insure transfer upon true loss or large variations of the AC input voltage.

Associated with the voltage monitor the UPS device furnishes a clipped AC voltage detector. This detector functions to inhibit transfer, usually forward to standby mode, upon an apparent but illusionary line under or low-voltage condition. Such a condition occurs when the load draws excessive peak current. The finite impedance of the AC input source or the UPS device, although relatively small, prevents the output voltage from attaining its normal voltage level under a heavy current draw by the load. This clips or cuts off the tops of the crests of the AC sinusoidal wave, apparently and incorrectly indicating an under voltage condition. Actually, the line source continues to supply full power and proper voltage; the detector inhibits the UPS device from transferring modes upon such an occurrence.

To determine whether to forward transfer from the normal to standby mode, the voltage monitor best needs to sense the voltages produced to the load at the output of the UPS device. This measures the performance of the AC input and the regulator. To determine whether to reverse transfer from the standby to normal mode, the voltage monitor best needs to sense the voltage sourced from the AC input at the input of the UPS device. This indicates return of AC input power. To satisfy these two divergent requirements, the UPS device forms the AC sample signal sensed by the monitor from either the device load output or AC input through electronic gates or switches. This enhances operation of the UPS device by sensing voltages from the most desirable location and minimizes the cost of the UPS device by using one voltage monitor circuit. The voltage dividers in the monitor produce two sets of limit signals, one input and one output to set different limits for determining forward and reverse transfer.

Lastly, the phased locked loop (PLL) circuit receives the AC sample signal and produces inverted signal 180° out of phase with the AC sample signal. The inverted signal and the precision sine wave signal from a local variable frequency oscillator then pass through separate flip-flops that divide in half the frequency of both signals. These two divided signals then become applied to the separate inputs of an exclusive OR gate. A fifty percentage duty cycle difference signal from the exclusive OR gate indicates perfect synchronization between the AC sample signal and the precision sine wave signal. This difference signal passes through an integrator of an error amplifier. The fifty percentage duty cycle difference signal produces from the error amplifier a current signal to the variable frequency oscillator to hold constant the frequency of the precision sine wave signal. Greater or lesser duty cycle difference signals to the error amplifier effect changes in the current signal and frequency changes in the oscillator to synchronize the precision sine wave signal to the AC sample signal.

BRIEF DESCRIPTION OF THE DRAWING

FIG. 19 is a circuit diagram of the snubbers block of FIG. 3;

FIG. 20 is a circuit diagram of the line filter block of FIG. 3;

FIG. 25 is a timing diagram of signals occurring in the phase-locked loop block of FIG. 3 at a 0 degree phase angle between an AC sample signal and a precision sine wave signal;

FIG. 26 is a timing diagram of signals occurring in the phase-locked loop block of FIG. 3 with the precision sine wave signal lagging the AC sample signal 90 degrees;

FIG. 30 is a graph presenting on the ordinate a percentage duty cycle of a signal output from the phase locked loop block of FIG. 3 and on the abscissa the phase angle of the precision sine wave signal relative to the AC sample signal;

DESCRIPTION OF THE PREFERRED EMBODIMENT

Figure 1:
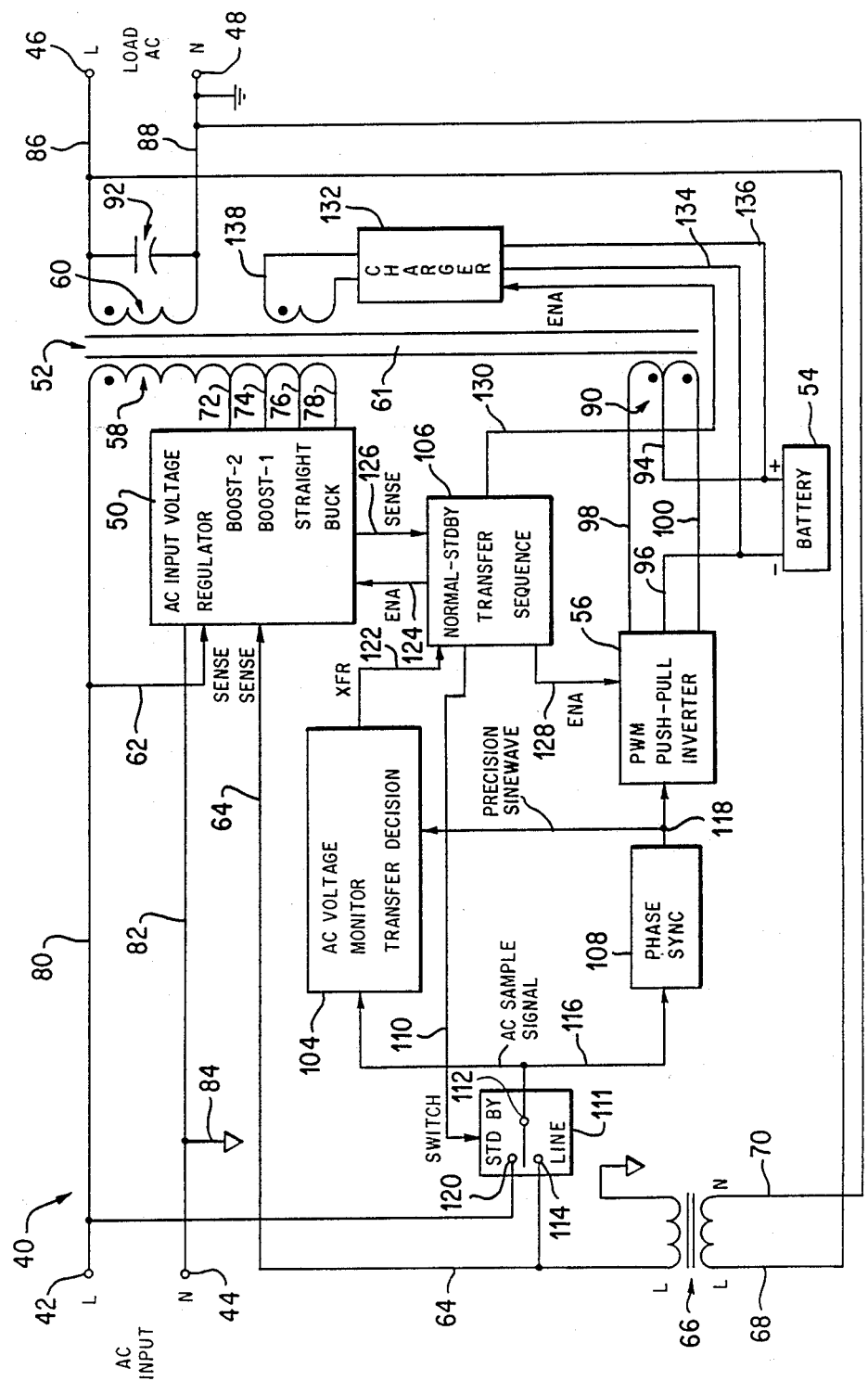
FIG. 1 is a schematic block diagram of the uninterruptible power supply device of the invention.

The invention best can be understood by referring to FIG. 1 and considering that the uninterruptible power supply (UPS) device 40 transmits AC electrical power from a AC input source connected to input terminals 42 and 44 to a load connected to load terminals 46 and 48 through the series connection of a line voltage regulator 50 and a transformer 52. Upon interruption of the AC electrical power at the input terminals 42 and 44, AC electrical power comes supplied to the load terminals 46 and 48 from a standby source of electrical power such as battery 54 through the series connection of inventer 56 and transformer 52.

Efficient transmission of AC electrical power from the input terminals 42, 44 to the load terminals 46, 48 occurs through first primary winding 58 to secondary winding 60, tightly coupled to one another through iron core 61 of transformer 52. Transformer 52 thus acts as an isolation, power or tightly coupled transformer in the normal mode of operation of the UPS device. In this mode, AC electrical power from the input terminals 42, 44 remain uninterrupted and is transmitted through windings 58, 60 to the load terminals 46, 48.

In the normal mode, AC input voltage regulator 50 sense through lead 62 the voltage of the AC electrical power appearing at input terminal 42 and also senses through lead 64, tightly coupled isolation transformer 66 and leads 68 and 70, the voltage of the AC electrical power transmitted to load terminals 46, 48. By sensing the AC input and load voltages, AC input voltage regulator 50 selects one off our tap leads 72, 74, 76 or 78 to be connected to the neutral line terminal 44 for maintaining the voltage at the load terminals 46, 48 within desired or certain voltage limits. The four tap leads furnish, respectively, a bucking voltage, a straight voltage, a boost-1 voltage and a boost-2 voltage in the secondary winding 60.

When the voltage at load terminals 46, 48 thus rises just above the certain voltage limits, the line voltage regulator 50 can connect tap 78 to neutral terminal 44 to buck or reduce the voltage appearing at the load terminals 46, 48. At the other end of the range of options available to voltage regulator 50, when the load voltage appearing at terminals 46, 48 fall just below the certain voltage limits, the line voltage regulator 50 can connect tap 72 to AC input terminal 44 to obtain the most boost or increase in the available voltage to maintain the voltage at load terminals 46, 48 within the certain narrow limits. Taps 74 and 76 provide intermediary options between these two extremes.

In completing the series connection in the normal mode, lead 80 connects the phase terminal 42 of the AC input to one side of the first primary winding 58 and lead 82 connects the neutral AC input terminal 44 to the line voltage regulator 50. Neutral AC input terminal 44 also connects to the reference common of the control circuitry from lead 82 through lead 84. On the secondary side of transformer 52, lead 86 connects the live load terminal 46 to one side of secondary winding 60 and lead 88 connects the neutral load terminal 48 to the other side of winding 60. Lead 10 connects the neutral load terminal 48 to the equipment chassis ground.

In the standby mode, the pulse width modulated, push-pull inventer 56 drives switched DC electrical power from battery 54 through a second primary winding 90 of transformer 52 to the secondary winding 60 and load terminals 46, 48. Second primary winding 90 loosely couples power to secondary winding 60 through iron core 61 to provide a high reactive impedance therebetween. The high reactive impedance between second primary winding 90 and secondary winding 60 effects an inductance used with capacitor 92 to form a low pass filter for integrating the PWM pulses from the inventer into sinusoidal waveform AC electrical power supplied to load terminal 46, 48. The line voltage regulator 50 disconnects the neutral AC input terminal 44 from the four taps 72, 74, 76 and 78 of the first primary winding 58 to isolate the AC input terminals from the load terminals. This prevents power from the inventer flowing back into the AC input, and first primary winding 58 plays no part in the supply of electrical power from battery 54 to the load terminals 46, 48.

The positive side of battery 54 connects by lead 94 to the center tap of winding 90 while the negative side of battery 54 connects through lead 96 to the inventer 56. A lead 98 connects the top of second primary winding to inventer 56 and a lead 100 connects the bottom of second primary winding to inventer 56. With inventer 56 alternatively connecting leads 98 and 100 to the negative side of battery 54 on lead 96, pulsed electrical power becomes transmitted through the core 61 of transformer 52 to secondary winding 60. This alternation of connection occurs typically at a frequency of 7 kilohertz, substantially above the line frequency of 60 hertz to effect a known pulse width modulation techniques for making a 60 hertz sinusoidal waveform at the load terminals 46, 48.

The UPS device 40 determines and effects the transfers between the normal mode and the standby mode through the operation of circuits contained in the AC voltage monitor transfer decision block 104 and the AC input-standby transfer sequence block 106. The UPS device 40 continues the AC electrical power supplied to load terminals 46, 48 from phase with the phase of the AC electrical power received at AC input terminals 42, 44 in phase sync block 108.

In the normal mode, transfer sequence block 106 produces a switch signal on lead 110 to connect terminal 112 to terminal 114 of switch 111. This selects the AC voltage signal occurring on lead 64 from the load terminals 46, 48 to appear as an AC sample signal on lead 116. Lead 116 carries the AC sample signal to the AC voltage monitor transfer decision block 104 and the phase sync block 108. In the normal mode then, the voltage and phase sensing performed by the UPS device 40 occurs effectively at the load terminals 46, 48. This insures that the AC voltage supplied to the load is within certain narrow voltage limits and that the inventer remains conditioned to be in phase with the AC electrical power supplied to the load. The phase information comes supplied to the inventer 56 from phase sync block 108 over lead 118. The signal appearing on lead 118 is called a precision sine wave signal.

In the standby mode, the transfer sequence block 106 produces a switch signal 110 that connects the terminal 112 to a standby terminal 120 of switch 111 to connect the live AC input terminal 42 thereto. This selects the AC sample signal appearing on lead 116 to be the phase side of the AC electrical power received from the AC input source at terminals 42, 44. This occurs so that the AC voltage monitor transfer decision block 104 can recognize the resumption of interrupted AC input source power and so that the phase sync block 106 can slew the inventer 56 into phase with the resumed AC input source power preparatory to transferring back to the normal mode.

The recognition of the presence and absence of proper voltage in the AC sample signal causes the AC voltage monitor transfer decision block 104 to produce a forward or reverse transfer signal on lead 122 to the transfer sequence block 106. Transfer sequence block 106 in turn properly sequences: the enabling on lead 124 of the regulator in response to a sensing signal on lead 126 therefrom, the enabling on lead 128 of the inventer 56 and the enabling on lead 130 of the battery charger 132.

Charger 132, in the normal mode, supplies desired DC electrical power on leads 134, 136 from a secondary charger winding 138 carried on core 61 to replenish the battery 54.

In the normal mode, UPS device 40 thus senses the voltage and phase of the electrical power supply to the load terminals 46, 48 in determining forward transfer to the standby mode and conditions the inventer to be in phase with the phase of the electrical power at load terminals 46 and 48. After the device 40 has forward transferred to the standby mode, it looks for return of the AC electrical power from the AC input source at input terminals 42, 44 in both sensing voltage and phase. Upon return of the electrical power from the AC input source, the device 40 returns or reverse transfers to sensing the voltage and phase at the load terminals 46, 48.

Figure 2:
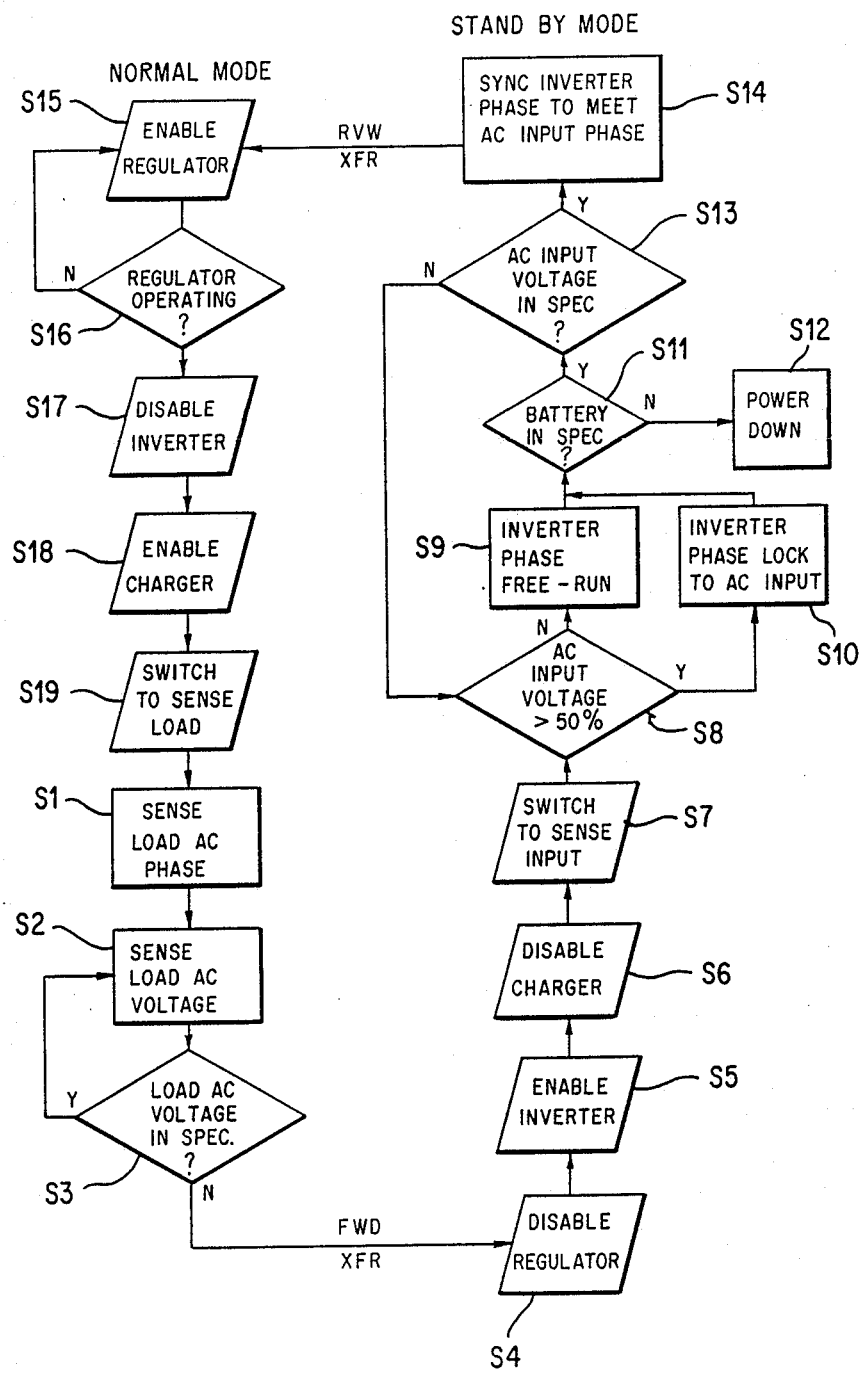
FIG. 2 is a flow chart of the general sequence of operations of the UPS device depicted in FIG. 1.

The flow chart of FIG. 2, generally represents the sequence of events in a forward transfer to standby mode and a reverse transfer to normal mode in UPS device 40. In a steady state normal mode operation transmitting AC electrical power from the AC input terminals to the load terminals, he supply 40 effects steps S1 and S2 to sense the load AC phase and to sense the load AC voltage. Steps S2 and S3 continuously determine whether the load AC voltage is within specification or certain voltage limits. If yes, the device 40 returns to step 2 and senses of load AC voltage. If no, the device 40 begins forward transfer in step 4 by disabling the regulator.

Once the regulator has been disabled, step S5 enables the inventer, step S6 disables the charger and step S7 affects the switch signal to sense the phase and voltage at the AC input terminals. In step S8, the AC input voltage is monitored and, if greater than 50% of rated input voltage, the inverter will maintain phase-lock to the AC input; if the AC input voltage is less than 50%, the inverter operates with a free-running output frequency determined by the local oscillator. While the inventer operates, the supply continuously checks in-step S11 to determine whether the voltage of the battery is in specification, and if not, the device powers down in step S12.

As long as the battery voltage continues in specification, in step S13 the device 40 determines whether the AC input voltage has returned to be within specification. If not, the device 40 returns to the step S8 of inventer operation and continues through the loop of steps S8, S9, S10 and S13.

When the line AC voltage returns to within specification, the device 40 moves to step S14 to synchronize the inventer phase to meet the phase of the AC electrical power from the AC input terminals 42, 44. In reverse transferring to the normal mode, step S15 first enables the regulator and after it has been determined that the regulator is operating in step S16, the supply then disables the inventer in step S17, enables the charger in step S18 and switches to sense the AC electrical power at the load terminals 46, 48 in step S19.

The supply 40 then has returned to the normal mode of operation and remains there in a steady state as long as there is continued AC electrical power appearing at the load terminals. The lefthand column of steps S15–S19 and S1–S3 then generally correspond to operation in the normal mode while the righthand column of steps S4–S14 generally correspond to operation in the standby mode. Transfer from the normal mode to the standby mode commonly is referred to as forward transfer while change of operation from the standby mode to the line mode commonly is referred to as reverse transfer.

Figure 3A:
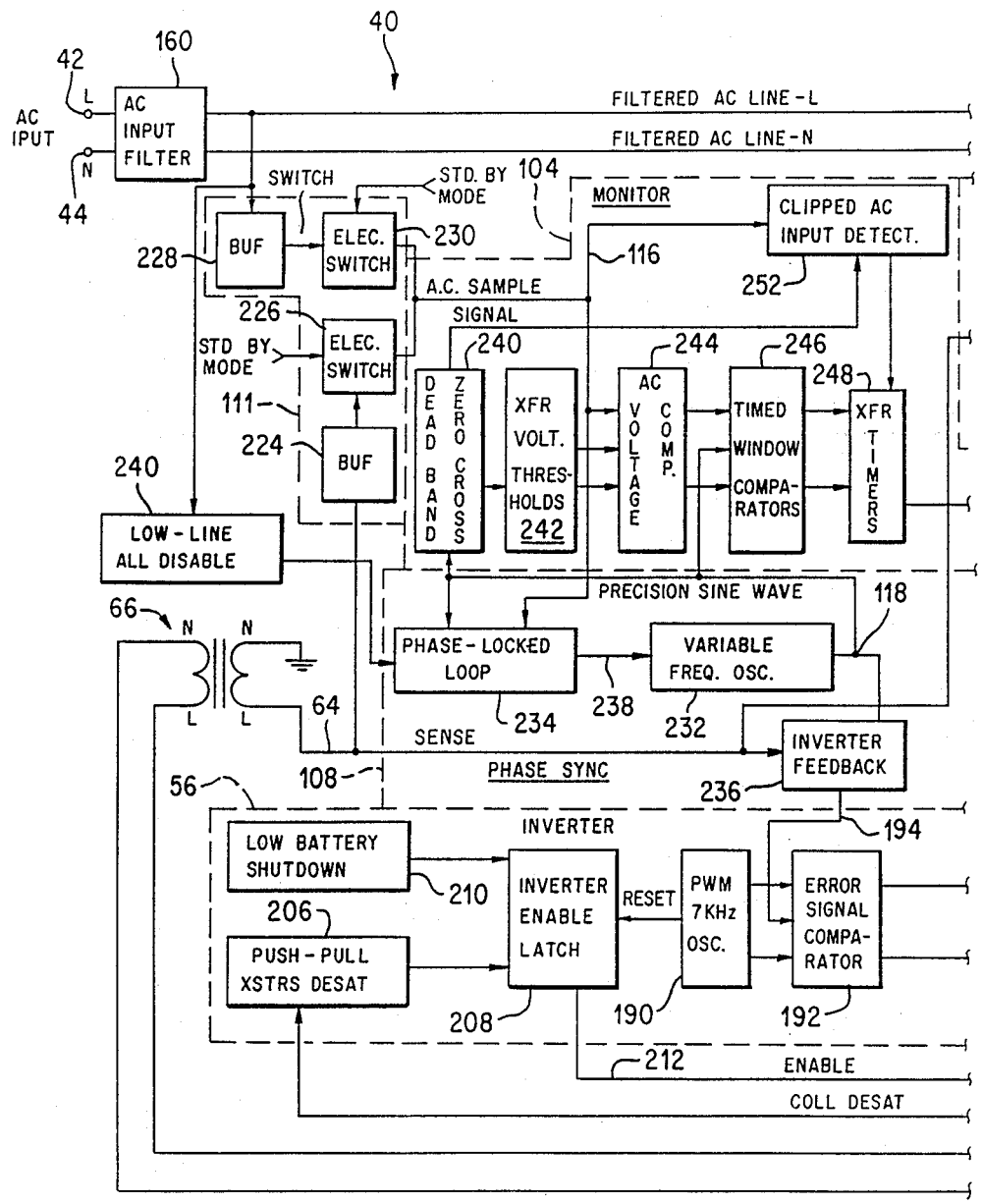
FIG. 3 is a more detailed schematic block diagram of the UPS device depicted in FIG. 1.
Figure 3B:
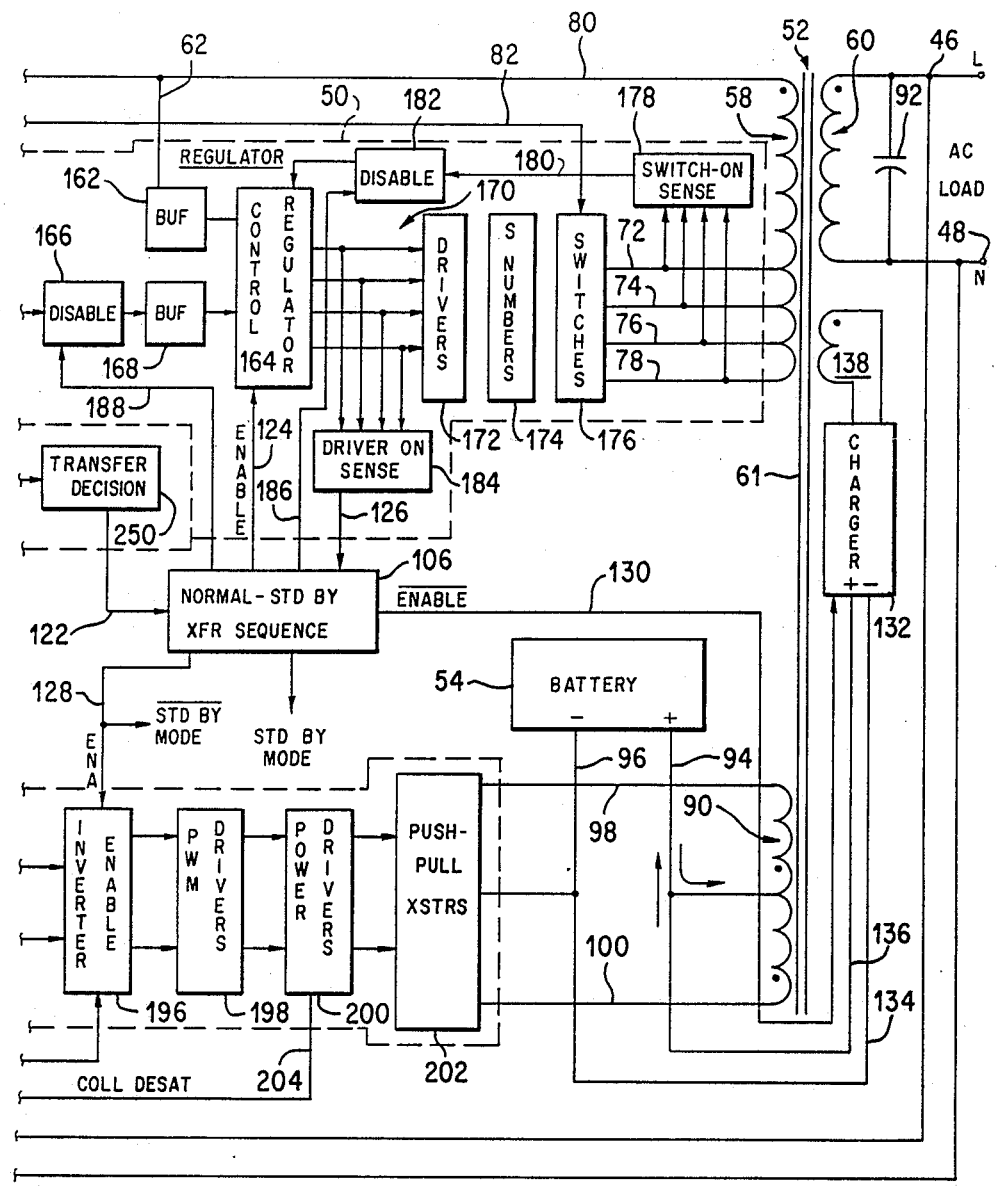

Referring to FIG. 3, the AC electrical power enters supply 40 at AC input terminals 42 and 44 and passes through a input filter 160 to form a signal called "filtered AC line-L" on lead 80 and a signal called "filtered AC line-N" on lead 82. Filtered AC line-L is carried by lead 62 into regulator 50 and particularly a buffer 162 and therefrom to a regulator controller 164. The load AC voltage represented by the sense signal on lead 64 from transformer 66 passes through disable circuit 166 and buffer circuit 168 also to control regulator controller 164. Regulator controller 164 can be such as a known programmed microcomputer receiving the AC input and load buffered voltage signals to determine which one of the four transformer tap leads to be selected in regulating the load AC voltage within desired narrow limits. One active output signal from regulator controller 164 passes on leads 170 to drivers 172, snubbers 174 to switches 176 connected to the tap leads 72, 74, 76 or 78 in first primary winding 58 of transformer 52. "This connects the filtered AC line-N signal on lead 82 through one of switches 176 to the one selected tap lead. Switch-on sense block 178 senses that one of the tap leads 72, 74, 76 or 78 carries electrical power to first primary winding 58, and this produces a signal on lead 180 through disable buffer 182 to regulator controller 164. Producing one active output signal on leads 170 from regulator controller 164 produces the sense signal earlier described on lead 126 through driver-on sense block 184. The normal-standby transfer sequence block 106 produces the previously described enable signal on lead 124 to enable the regulator controller 164 while also producing a disable signal on lead 186 to disable circuit 182 and a disable signal on lead 188 to disable circuit 166.

In continuous normal mode operation, the enable signal on lead 124 from the normal-standby transfer sequence block 106 stays active. Regulator 50 passes the filtered AC line-L signal and the load AC voltage signal to regulator controller 164, which in turn produces one active output signal on leads 170 to connect one of taps 72–78 to the filtered AC line-N signal. Switch-on sense block 178 passes its signal through the disable circuit 182 back to regulator controller 164 and the driver-on sense block 184 produces the sense signal on lead 126 to the normal-standby transfer sequence. In the normal mode, the switch-on sense block 178 informs the regulator controller 164 that one tap switch 176 turned on, to avoid turning on a second tap switch that can have harmful effects to be explained.

In forward transfer from the normal mode to the standby mode, the normal-standby transfer sequence block 106 turns off the regulator enable signal on lead 124. This turns off all controller output signals on leads 170, so that the one turned-on switch in block 176 turns off automatically. This isolates the AC electrical power appearing at the AC input terminals 42, 44 from the first primary winding 58 of transformer 52. The inventer 56 then operates, with the open switches in block 176 preventing the electrical power supplied to the load through secondary winding 60 and magnetically coupled to the first primary winding 58 from also supplying AC electrical power to the AC input terminals 42, 44 and the AC input source.

Upon reverse transfer, load voltage disable circuit 166 becomes activated so that the regulator controller 164 appears to sense zero volts at the AC load terminals 46, 48, which actually carry the AC voltage produced from the standby inventer. Switch-on sense disable circuit 182 is activated so that the power supplied from the inventer to the secondary winding 60 and magnetically coupled into first primary winding 58 does not appear to indicate in switch-on sense block 178 that one of the switches in block 176 has been activated. The normal-standby transfer sequence block 106 then produces the regulator enable signal on lead 124 and regulator controller 164 outputs one active signal on leads 170. This becomes sensed in driver-on sense block 184 to produce the sense signal on lead 126 indicating that the regulator 50 has been activated and that the inventer can be disabled from supplying electrical power to the load terminals 46, 48.

In inventer 56, 7 kilohertz oscillator 190 produces two in-phase, triangular signals to error signal comparator 192. Comparator 192 also receives an inverter feedback signal on lead 194 from the phase sync block 108 to produce a pair of pulse width modulated driver signals to the inventer enable block 196. This pair of pulse width modulated drive signals pass through the PWM drivers in block 198 and the power drivers in block 200 to the push-pull transistors in block 202. The push-pull transistors in block 202 in turn alternatively connect the leads 98 and 100 from the second primary winding 90 to the negative terminal of battery 54 to produce power pulses magnetically coupled by core 61 to the secondary winding 60 of transformer 52. With the high leakage reactive inductance existing between second primary winding 90 and secondary winding 60, in conjunction with the capacitance of capacitor 92, the pulse width modulated signals appear on the load terminals 46,48 as a smooth sinusoidal AC electrical power signal.

The power drivers block 200 produces a signal called "collector desaturation" on lead 204 that becomes received by a push-pull transistors desaturation circuit in block 206. The output from the push-pull transistors desaturation circuit in block 206 passes to an inverter enable latch 208, which also receives a low battery shutdown signal from block 210 and therefrom produces an enable signal on lead 212, received by the inverter enable block 196. The inverter thus can be disabled or shut down by the collectors of the push-pull transistors coming out of saturation or the voltage of the battery 54 falling below a desired point. The inverter operation also remains controlled through the enable signal previously described on lead 128 from the normal-standby transfer sequence block 106.

The enable signal on lead 128 is active in the low state to indicate the standby mode and is called Standby Mode Not. The normal-standby transfer sequence block 106 also produces another complementary control signal that is active in the high state and that is known as StandBy Mode. These two signals, StandBy Mode and StandBy Mode Not appear at switch 111.

In the normal mode, these two complementary signals pass the load AC voltage sense signal on lead 64 from transformer 66 through buffer 224 and electronic switch 226 to lead 116 to form the AC sample signal previously described. These two complementary signals also block the filtered AC line-L signal on lead 80 from passing through buffer 228 and electronic switch 230 to lead 116. In the standby mode, the condition of these two signals and the switch becomes reversed. The buffer 228 and electronic switch 230 pass the filtered AC line-L signal to lead 116 to form the AC sample signal while buffer 224 and electronic switch 226 block the load AC voltage signal from lead 64 and transformer 66 from reaching lead 116.

In phase sync block 108, the variable frequency oscillator 232 produces a signal, previously described as the precision sine wave signal, on lead 118 to the phase-locked loop block 34 and the inverter feedback block 236. The phase locked loop block 234 uses the precision sine wave signal and the AC sample signal to control through lead 238 the frequency of the variable frequency oscillator 232. The inverter feedback block 236 uses the precision sine wave signal on lead 118 and the load AC voltage signal on lead 64 from transformer 66 to produce the inverter feedback signal on lead 194 to the inverter 56.

The inverter feedback block 236 attempts to maintain the AC output voltage supplied from the inverter to the load terminals 46, 48 synchronized in phase with the precision sine wave signal. This occurs in the standby mode when the phase sync block 108 looks at the AC sample signal from the AC input terminals to bring the variable frequency oscillator 232 into phase synchronization with the returning AC voltage from the AC input source.

In the normal mode, the phase locked loop block 234 receives the AC sample signal from the load terminals to synchronize the variable frequency oscillator and precision sine wave signal on lead 18 with the phase of the voltage from the load terminals. In standby mode, when the voltage of the AC electrical power from the AC input source falls below 50% of the rated input, the low-line phase-locked loop disable block 240 disables the phase-locked loop 234, enabling the variable frequency oscillator 232 to free run at a preset frequency. When the voltage of the AC electrical power from the AC input source returns to greater than 50% of rated, the low-line phase-locked loop disable block 240 enables the phase-lock loop block 234 to sense and become synchronized with the phase of the returning input voltage. Through lead 238, the phase-locked loop slews the phase and frequency of the variable frequency oscillator in block 232 to match that of the returned AC voltage from the AC input source. This changes the phase of the inverter to make a smooth return or transfer back to the normal mode transmission of electrical power through the first primary winding of the transformer 52.

The monitor 104 uses the precision sine wave signal on lead 118 in the dead-band zero crossing block 240 to produce an AC signal with flattened zero crossing characteristics. This signal becomes used in the transfer voltage threshold block 242 to make two AC voltage signals. The first is a high voltage limit signal attaining the maximum voltage of a certain limit desired for the UPS device 40 to remain in the normal mode. The other is a minimum voltage limit signal attaining only the minimum voltage of a certain limit desired to maintain the UPS device 40 in the normal mode. These two AC voltage signals are applied together with the AC sample signal 116 to the AC voltage comparator block 244 that produces logic level signals in phase or out of phase with the precision sine wave signal depending on whether the AC sample signal remains within or exceeds, respectively, the threshold signals. This phase difference becomes determined in timed window comparators 246, the outputs of which are supplied to transfer timers 248 and transfer decision block 250 to produce a transfer signal previously described on lead 122 to the normal-standby transfer sequence block 106. Briefly, the transfer signal on lead 122 indicates that device 40 should be in the normal or standby modes.

Figure 4:
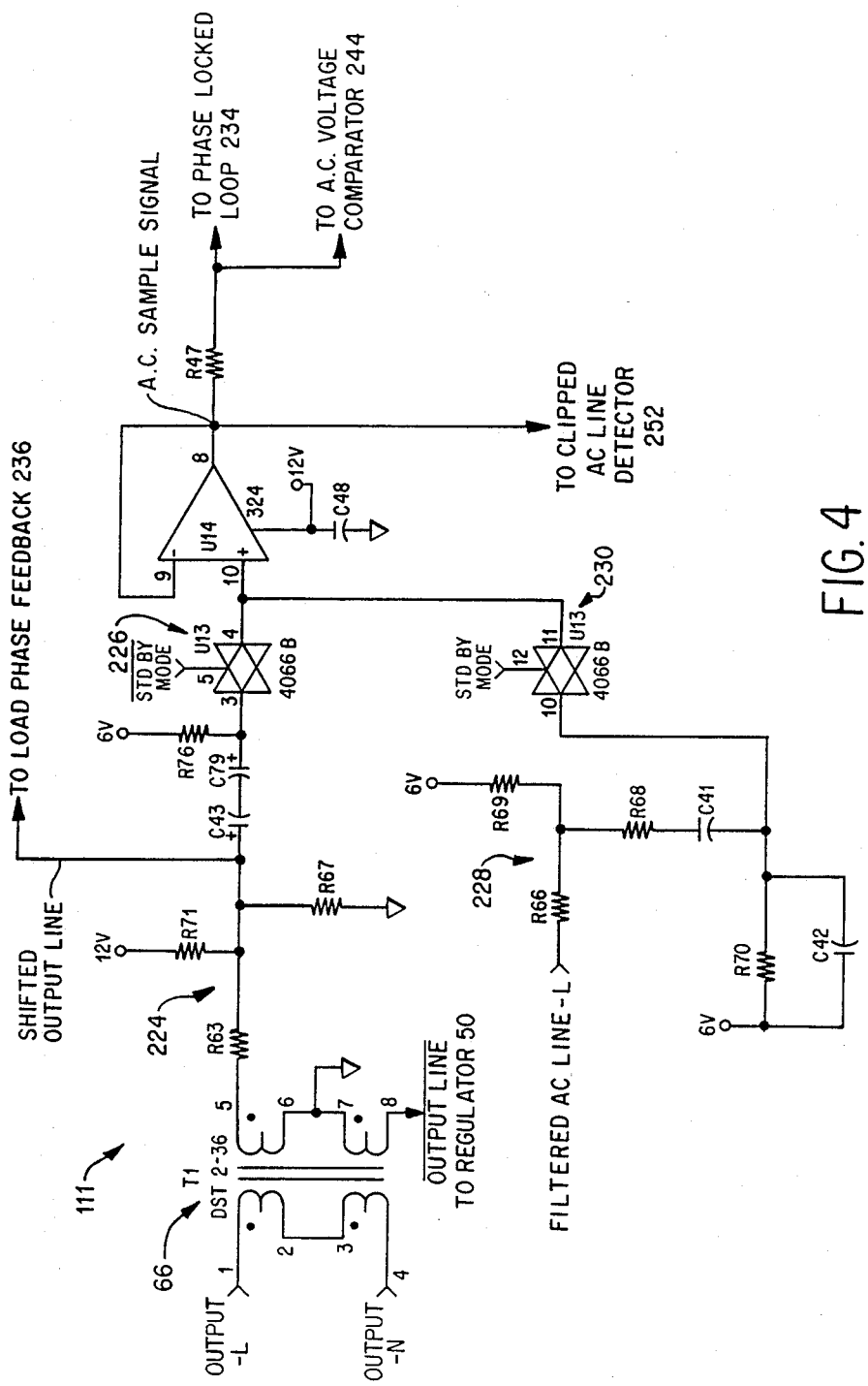
FIG. 4 is a circuit diagram of the switch block depicted in FIGS. 1 and 3.

In FIG. 4, T1 transformer 66 receives respectively on pins 1 and 4 the AC load or output phase and neutral signals. Pins 2 and 3 are strapped together on the primary side while on the secondary side, pins 6 and 7 are strapped together and are connected to signal ground. Pin 8 of transformer 66 produces a signal called Output Line Not while pin 5 produces a signal that passes through buffer 224 comprising series resistance R63 and voltage dividing resistors R71 and R67, to become a signal called Shifted Output Line. These three resistors step down the voltage of the signal from transformer 66 and level shift it so that the zero crossings of the AC signal appear at a +6 volt DC offset. Throughout the circuits of the UPS device 40, AC signals exist with a +6 volt DC offset to maintain them in a positive voltage domain. This avoids handling AC signals in a positive and negative domain and with positive and negative power supplies.

Electric switch 226, comprising a CMOS transmission gate receives at pin 3 the Shifted Output Line signal after it passes through capacitors C43 and C79. Resistance R76 ties this point to a +6 volts DC offset. Switch 226 conducts the Shifted Output Line signal to the buffer U14 pin 10 upon receipt of a Standby Mode Not signal on pin 5. This active low signal transmits any signal on pin 3 to pin 4 and therefrom to the buffer pin 10.

The Filtered AC Line-L signal passes on buffer 228 comprising resistor R66 and R69 that attenuate and level shift the AC signal to a +6 volt DC offset. That signal then passes through a Wein filter comprising resistor R68, capacitor C41, resistor R70 and capacitor C42 also tied to +6 volts, providing a low pass filter with a zero phase shift. This effects a noise filter for the phase-lock loop later to be described.

Electric switch 230, comprising a CMOS transmission gate U13, receives the attenuated and filtered AC input phase signal on pin 10 thereof and transmits same to the buffer U14 pin 10 upon receipt of an active high Standby Mode signal on pin 12. The Standby Mode and Standby Mode NOT signals received respectively at switches 230 and 226 thus alternately pass, respectively, the AC input and load AC voltage waveforms to buffer U14 pin 10. Buffer U14 pin 8 produces the AC sample signal previously described, which feeds back to the negative input pin 9 of buffer U14 and goes to the clipped AC line detector 252 and, through resistor R47, to the phase-locked loop 234 and the AC voltage comparator 244.

Figure 5:
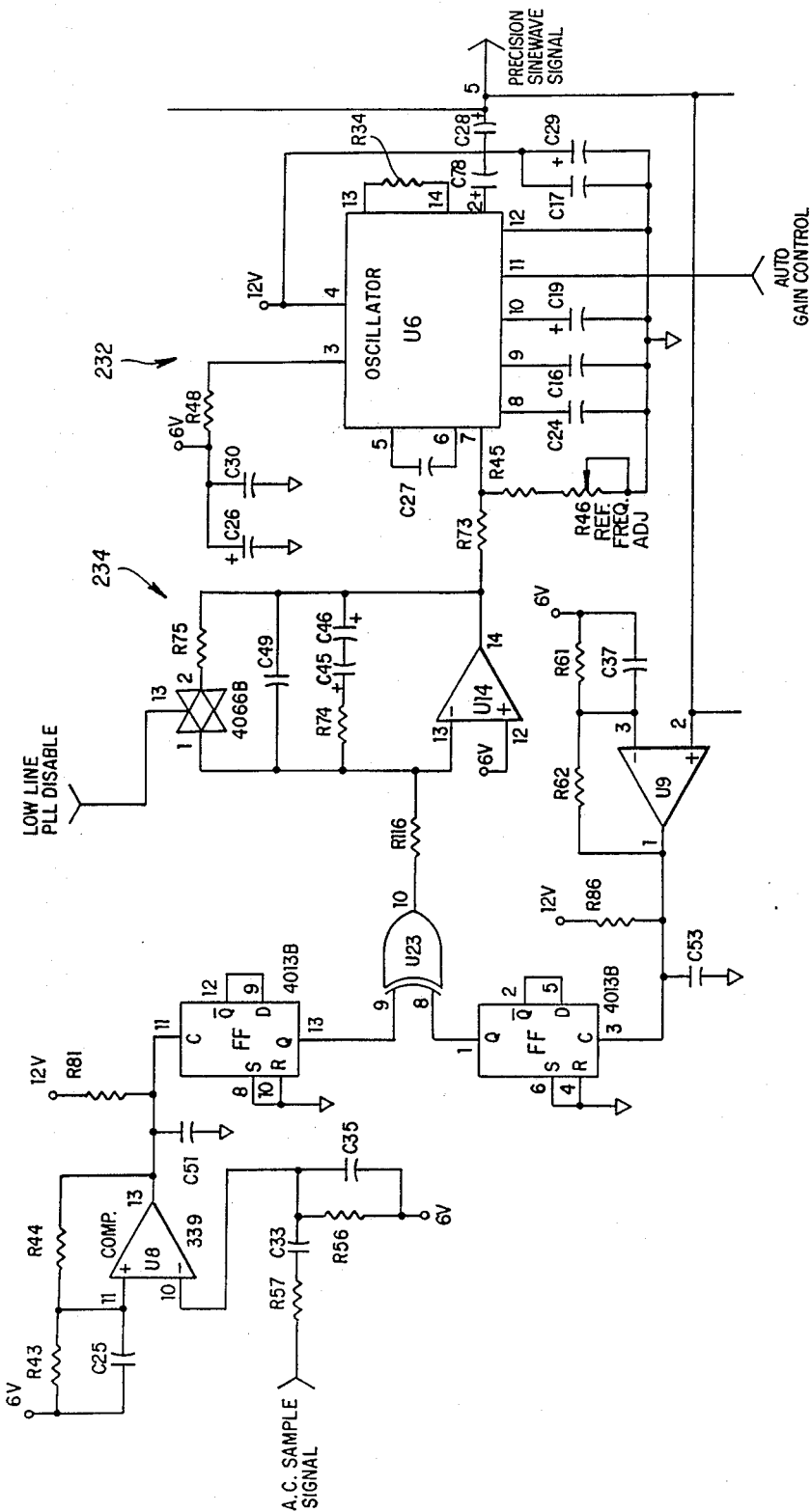
FIG. 5 is a circuit diagram of the phase locked loop and variable frequency oscillator blocks of FIG. 3.

In FIG. 5, the variable frequency oscillator 232 comprises the components peripheral to oscillator U6 up to and including resistance R73 connected to pin 7 thereof while the phase-locked loop 234 comprises the remainder of the components. The phase-locked loop 234 operates to maintain the precision sine wave signal, produced from pin 2 of oscillator U6, at the same phase and frequency as the AC sample signal produced at switch 111 from the AC load or input voltage waveforms. An AC input voltage below a certain minimum produces the low-line PLL disable signal to transmission gate U13 pin 1 to disable the phase-locked loop. This allows the oscillator U6 to produce a precision sine wave signal having a phase and frequency determined only by the components peripheral thereto.

Oscillator U6 can be any monolithic function generator such as an XR-2206 made by Exar Integrated Systems, Inc. of Sunnyvale, CA. A timing capacitor C27 connects to the pins 5 and 6 thereof to set the free run frequency of the precision sine wave signal. Pin 7 of oscillator U6 receives a variable current from the phase-locked loop 234 to vary the frequency of the precision sine wave signal. The remaining components peripheral to oscillator U6 perform biasing, filtering and conditioning functions. Additionally, pin 1 receives an automatic gain control signal from a separate circuit to be described.

The phase-locked loop 234 operates to produce from error amplifier U14, pin 14 a steady state current into resistor R73 to maintain the precision sine wave signal in phase and frequency with the AC sample signal. This occurs by exclusive OR gate U23, pin 10 producing a 50 percent duty cycle signal to the error amplifier U14, pin 13. This signal, which swings between +12 and 0 volts, passes through resistor R116 and becomes compared to the +6 volt supply signal applied to thee error amplifier U14 pin 12. Lesser or greater duty cycle waves into error amplifier U14 pin 13 produce changes in the frequency of the precision sine wave signal to force same to become in phase with the AC sample signal, return the output of U23, pin 10 to a 50% duty cycle.

The AC sample signal from switch 111 and resistor R47 first passes through a Wein filter comprising resistor R57, capacitor C33, resistor R56 and capacitor C35 to comparator U8, pin 10. Together with resistors R43, R44 and capacitor C25 connected to the comparator U8 pins 11 and 13, comparator U8, pin 13 produces a 60 hertz square wave signal coupled to ground by capacitor C51 and to +12 volts through resistor R81. Flip-flop U15, pin 11 receives this 60 hertz square wave at the clock input thereof, and divides same to a 30 hertz signal that becomes applied to exclusive-OR gate 23, pin 9.

In a similar manner the precision sine wave signal becomes applied to comparator U9, pin 2 to produce a 60 hertz square wave signal in conjunction with resistors R61, R62 and R86 and capacitors C37 and C53. The clock input of flip-flop U15, pin 3 receives this 60 hertz square wave signal and divides same into a 30 hertz signal at pin 1, which becomes applied to the exclusive-OR gate U23 pin 8.

Referring also to FIG. 25, in which the AC sample signal and precision sine wave are shown to be in phase, the 60 hertz square wave signal appearing at pin 13 of comparator U8 is 180° out of phase with the AC sample signal, which was applied to the negative input, pin 10, of comparator U8. In contrast, the 60 hertz square wave signal produced by comparator U9 at pin 1 is in phase with the precision sine wave signal, which is applied to the positive input, pin 2, of comparator U9. This phase difference of 180° in 60 hertz signals becomes a phase difference of 90° at pins 8 and 9 of the exclusive-OR gate U23 through the frequency dividing flip-flops U15, pins 1 and 13 respectively. This 90° phase difference between the square wave signals appearing at pins 8 and 9 of exclusive-OR gate U23 produces a 50 percent duty cycle square wave at the output pin 10 of exclusive-OR gate U23.

Referring also to FIG. 26, in which the precision sine wave signal lags the AC sample signal by 90°, exclusive-OR gate U23 pin 10 produces a 25 percent duty cycle signal to the error amplifier pin 13.

Figure 27:
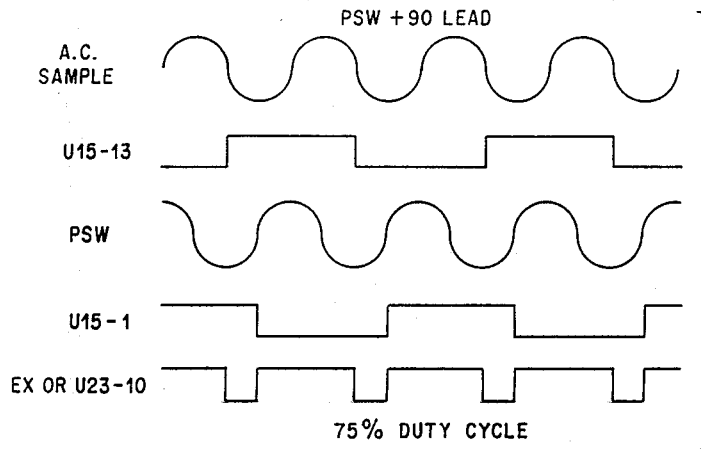
FIG. 27 is a timing diagram of signals occurring in the phase-locked loop block of FIG. 3 with the precision sine wave signal leading the AC sample signal 90 degrees.

Also referring to FIG. 27, in which the precision sine wave signal leads the AC sample signal by 90°, the exclusive-OR gate U23 pin 10 produces a 75 percent high duty cycle signal to the error amplifier U14 pin 13.

Figure 28:
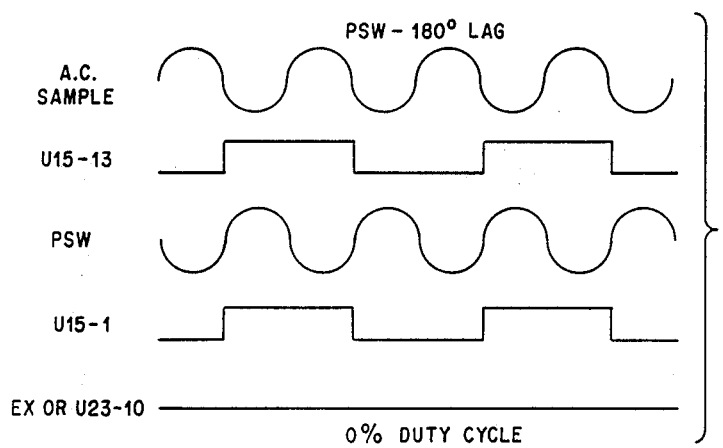

Also referring to FIG. 28, in which the precision sine wave signal lags the AC sample signal by 180°, the 30 hertz signals produced at the frequency dividing flip-flops pins 13 and 1 produce square wave signals in phase with one another. Exclusive OR gate U23 pin 10 in response thereto produces a constant low level signal having a zero percentage duty cycle.

Figure 29:
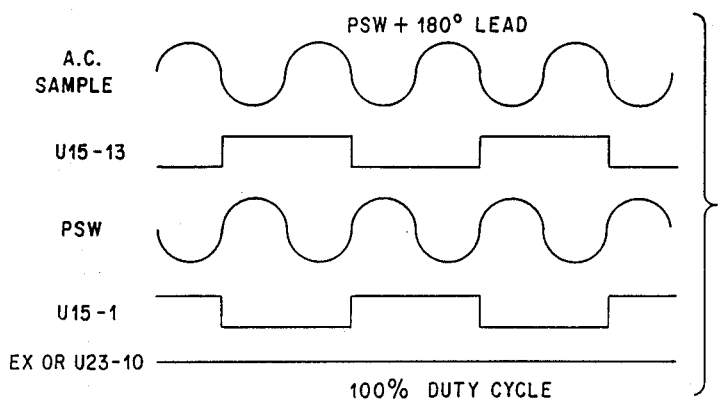

Referring also to FIG. 29, in which the precision sine wave signal leads the AC sample signal by 180°, pins 13 and 1 of the frequency dividing flip-flops U15 produce signals that are 180° out of phase with one another. Exclusive OR gate U23 pin 10 in response thereto produces a constant high level signal having a 100 percent duty cycle.

In FIG. 30, plotting the phase difference between the precision sine wave signal and the AC sample signal on the abscissa from −180° to +180° and the obtained percentage duty cycle of the signal output of pin 10 of the exclusive OR gate U23 results in straight line 254. This indicates that differences in the phase between the precision sine wave signal and AC sample signal varies the current into or out of oscillator U6 pin 7 to bring the frequency thereof back into synchronization with the AC sample signal.

Capacitors C49, C45 and C46 and resistor R74 provide desired feedback from error amplifier U14 pin 14 to pin 13 thereof. An active state in the low-line PLL disable signal received at transmission gate U13, pin 13 activates the same connecting the error amplifier U14, pin 14 to pin 13 through resistor R75. This connection through resistor R75 forces the output of the phase-locked loop to about +6 volts DC and allows oscillator U6 to free-run at its preset frequency. When the low-line PLL disable signal returns to the inactive state, the transmission gate U13 opens the connection between pins 1 and 2 thereof and error amplifier U14 resumes desired operation.

Figure 6:
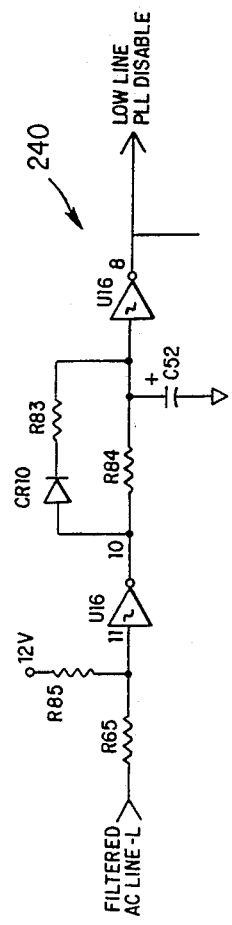
FIG. 6 is a circuit diagram of the low line PLL disable block of FIG. 3.

In FIG. 6, the low-line PLL disable circuit 240 produces an active state in the low-line PLL disable signal in response to the voltage of the filtered AC input signal falling below 50% of the rated input. Resistors R85 and R65 form an attenuator of the filtered input voltage. Schmitt trigger inverter U16 produces a square wave from the attenuated input voltage. Diode CR10, resistors R83 and R84, and capacitor C52 form an integrator of the square wave signal obtained from Schmitt trigger inverter U16, pin 10. When this integrated signal carried on the positive side of capacitor C52 falls below about 6 volts DC, Schmidt trigger inverter U16, pin 8 produces an active high level on the low-line PLL disable signal When the voltage on capacitor 52 returns to above about 6 volts DC, Schmidt trigger inverter U16, pin 8 produces an inactive low level on the low-line PLL disable signal.

Figure 7:
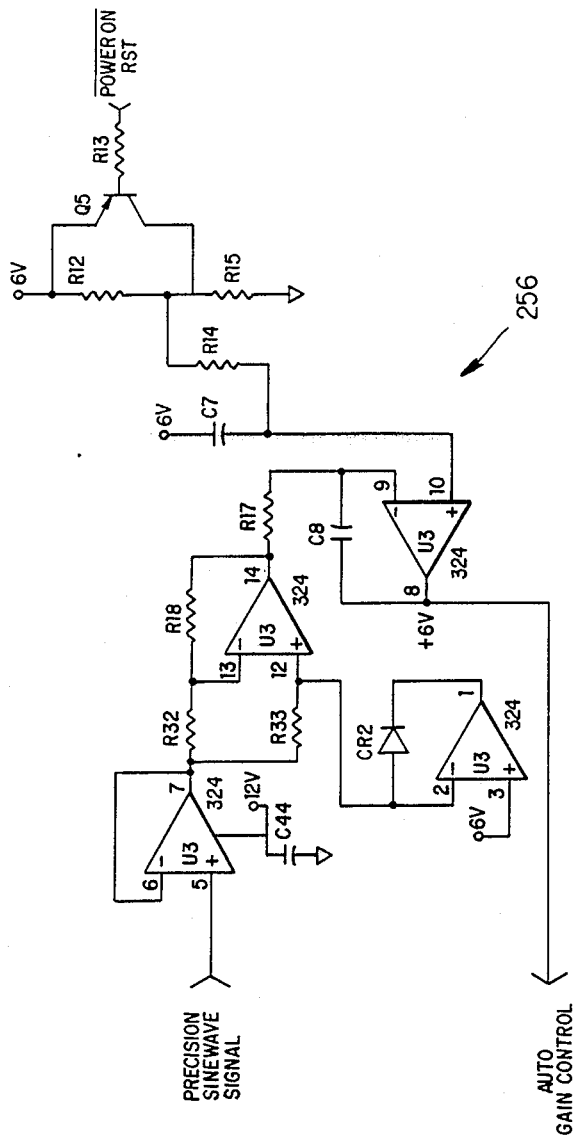
FIG. 7 is a circuit diagram of an auto gain control circuit used with the variable frequency oscillator circuit of FIG. 5.

In FIG. 7, automatic voltage gain circuit 256 receives the precision sine wave signal at buffer U3, pin 5 to produce an automatic gain control signal at error amplifier U3, pin 8 that controls the voltage swing of the precision sine wave signal generated by oscillator U6 in the variable frequency oscillator 232. The buffered precision sine wave signal from U3, pin 7 effects an inverted, full wave rectified signal depending from a +6 volt DC offset at the output pin 14 of amplifier U3. This occurs through the cooperation of resistors R32, R18, R33, diode CR2 and operational amplifier U3, pins 1, 2 and 3. Error amplifier U3 pin 8 produces a signal responsive to this inverted, full wave rectified signal received through resistor R17 and fed back through capacitor C8 in response to a DC reference level applied to pin 10 thereof. This DC reference comes supplied from resistors R12, R15 and R14 with capacitor C7 providing some filtering. Upon the original startup of the supply, resistor R13 and transistor Q5 supply a soft startup of the DC reference voltage supplied to error amplifier U3, pin 10 responsive to the Power-On Reset Not signal applied to resistor R13.

Figure 8:
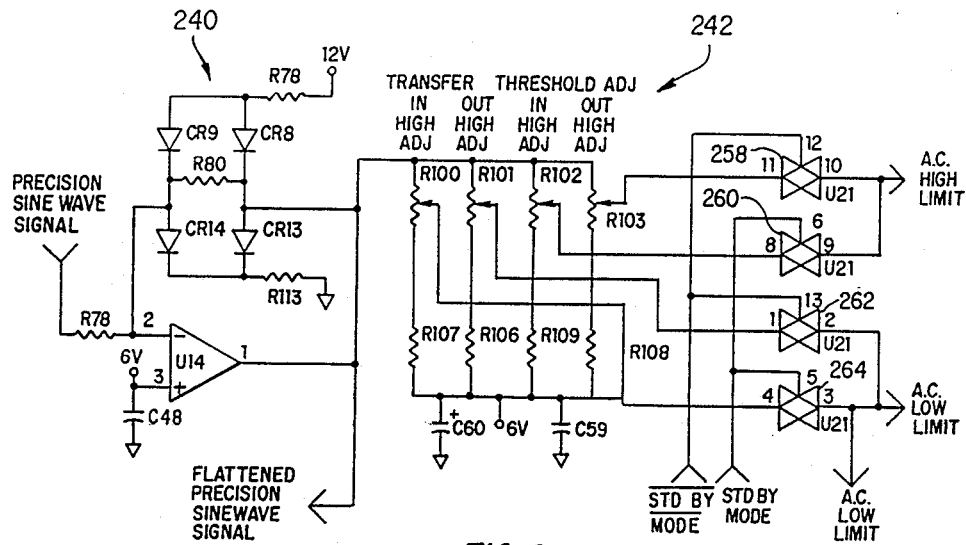
FIG. 8 is a circuit diagram of the dead-band zero-cross and transfer voltage threshold block of the monitor in FIG. 3.

In FIG. 8, the dead-band zero crossing signal circuit 240 comprises amplifier U14 that receives on pin 2 the precision sine wave signal through resistor R78 to produce a dead-band precision sine wave signal on pin 1 thereof. Amplifier U14, pin 3 receives +6 volts at the positive or non-inverting input that is also tied to ground through capacitor C48. A bridge circuit comprising resistor R79, diodes CR8 and CR9, resistor R80, diodes CR13 and CR14 and resistor R113 tied between +12 volts and ground and pins 1 and 2 of the amplifier U14 provides the desire feedback for amplifier U14 pins 1 and 2.

The dead-band precision sine wave signal then passes into the transfer voltage threshold circuit 242 comprising four parallelly connected voltage dividers tied between the dead-band precision sine wave signal and +6 volts. The input-low adjust divider comprises variable resistor R100 and resistor R107, the output-low adjust divider comprises variable resistor R101 and resistor R106. The input-high adjust divider comprises variable resistor R102 and resistor R109, and the output-high adjust divider comprises variable resistor R103 and resistor R109. The common connection between resistors R107, 106, 109 and 108 also tie to ground through capacitors C59 and C60. The two high-adjust dividers become connected through transmission gates 258 and 260 to the AC high-limit signal appearing at pins 10 and 9 thereof. The two low-adjust dividers become connected through transmission gates 262 and 264 to the AC low-limit signal through pins 2 and 3 thereof.

The signal Standby Mode connects to pins 6 and 5 of transmission gates 260 and 264 to select the signals from the two input adjust dividers when the UPS device 40 continues in the standby mode of operation. The Standby Mode Not signal connects to pins 12 and 13 of transmission gates 258 and 26 to select the signals from the two output adjustment dividers when the UPS device 40 continues in the normal mode. The AC high and low-limit signals manually can be adjusted to the absolute maximum and minimum voltages desired to form dynamic limits against which to test the voltage values of the AC sample signal. Because the precision sine wave signal from which the AC high and low-limit voltage signals are produced remains in synchronization with the AC sample signal, the AC high-limit and AC low-limit signals present reliable dynamic values against which the voltage of the AC sample signal can be tested.

Figure 31:
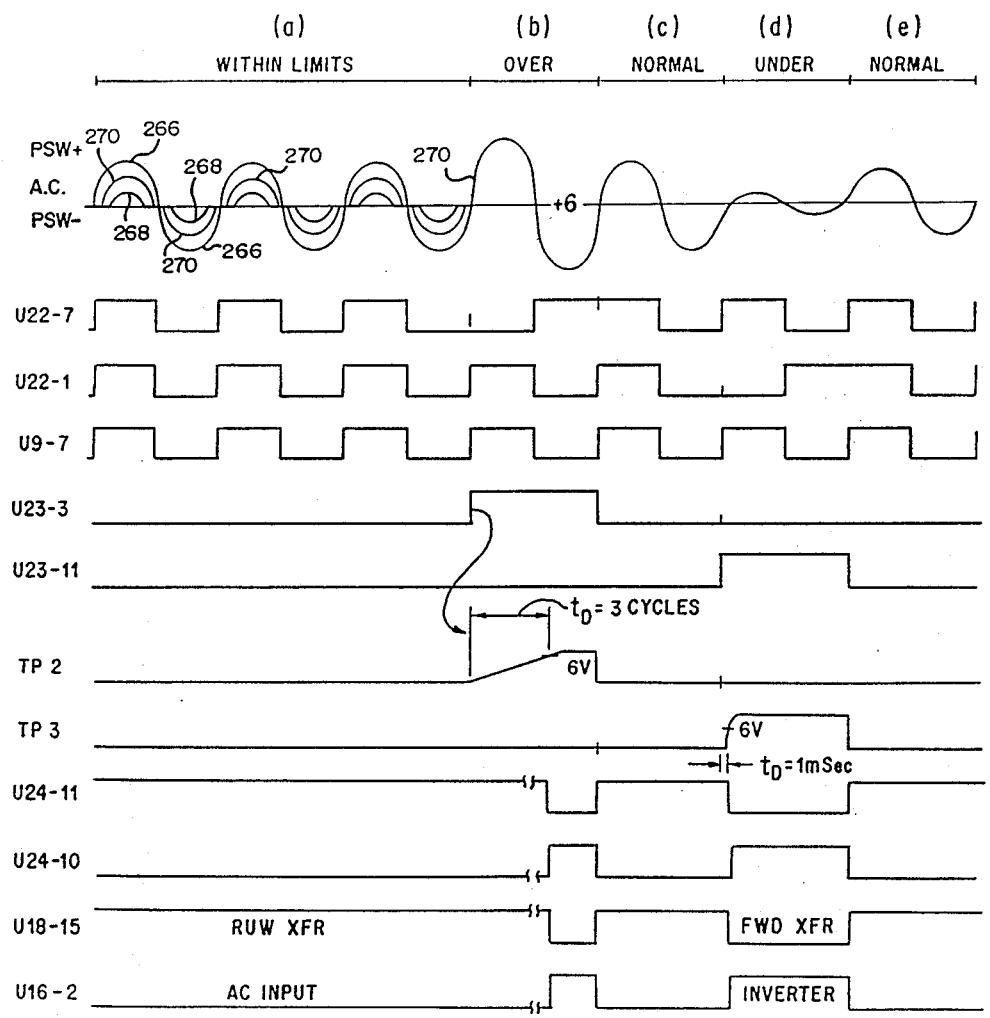
FIG. 31 is a timing diagram of idealized signals occurring in the line voltage monitor transfer decision block of FIG. I, in which part:
(a) indicates the AC sample signal within desired voltage limits;
(b) indicates the AC sample signal above desired voltage limits;
(c) indicates the AC sample signal returned to within desired voltage limits;
(d) indicates the AC sample signal below desired voltage limits; and
(e) indicates the AC sample signal returned to within desired voltage limits.
Figure 32:
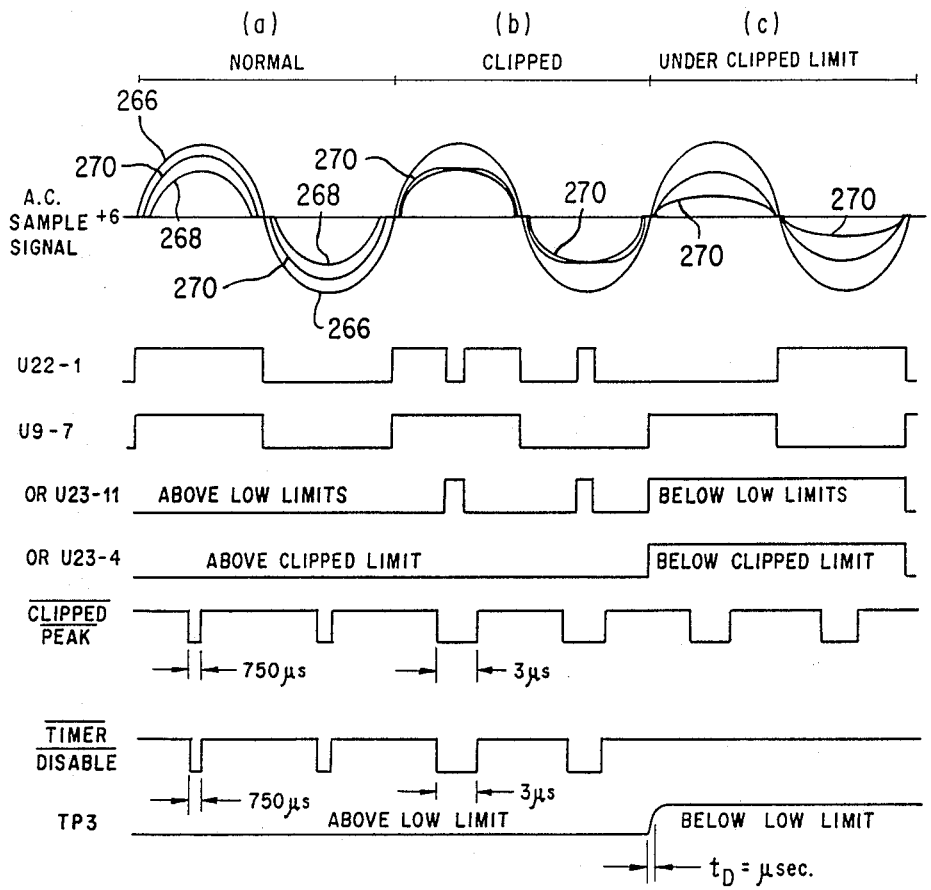
FIG. 32 is a timing diagram of idealized signals occurring in the line voltage monitor transfer decision block of FIG. 1 particularly relating to clipped AC sample signal detection, in which part:
(a) indicates an unclipped AC sample signal;
(b) indicates a clipped AC sample signal; and
(c) indicates an AC sample signal below desired voltage limits.

Also referring to FIGS. 31 and 32, the top waveforms depict the AC high-limit waveform 266 superimposed on the AC low-limit waveform 268 with the AC sample signal 270 occurring therebetween. In actuality, these three voltage waveforms never appear on the same lead but are shown in FIGS. 31 and 32 superimposed on the same time line to facilitate understanding the invention. Notice that both of the AC high and low-limit signals 266 and 268 become flattened for a short period at the zero voltage crossing point to desensitize the comparators to be described during zero crossings to avoid phase shifting problems. In FIG. 31, parts (b)–(e) depict only the AC sample signal 270 to avoid confusion with signals 266 and 268.

Figure 9:
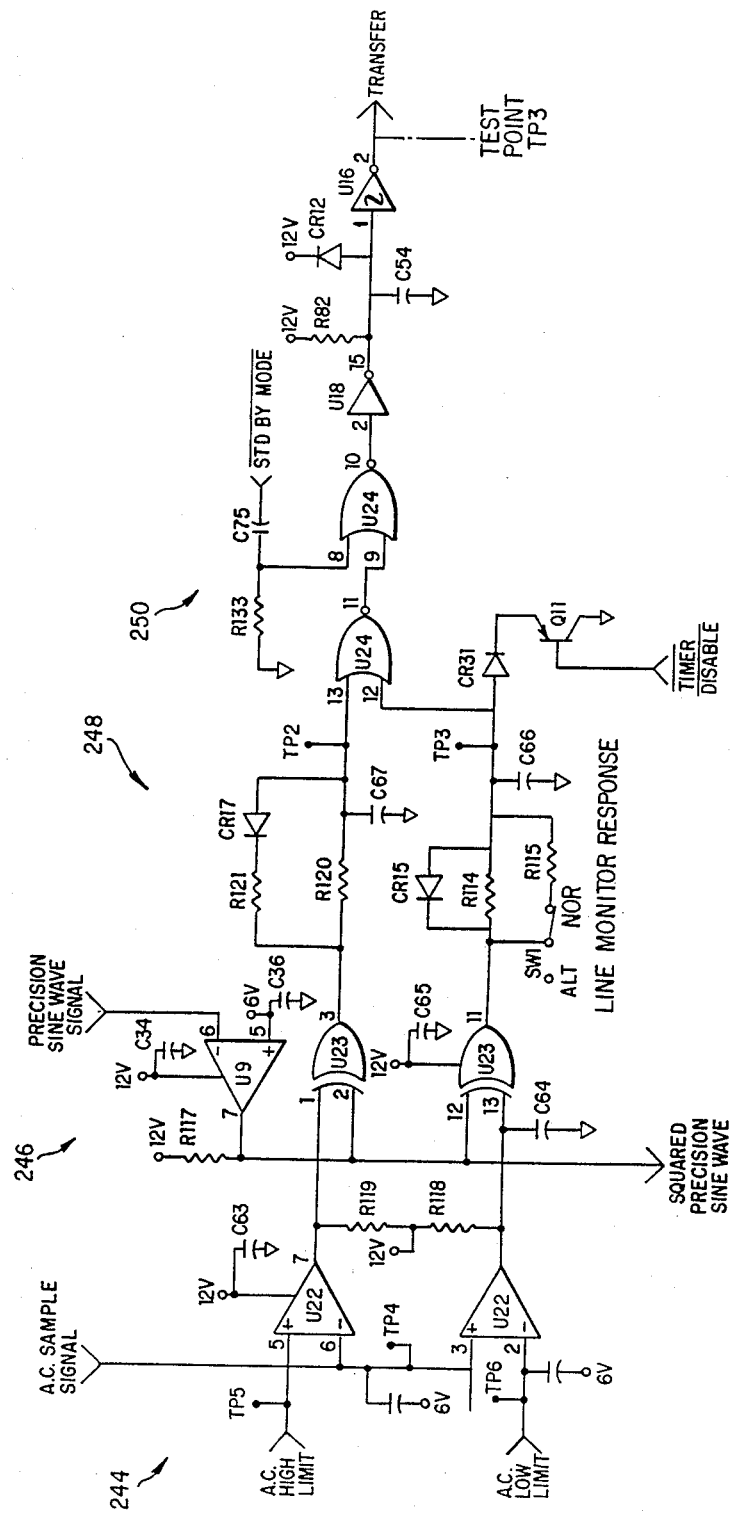
FIG. 9 is a circuit diagram of the AC voltage comparator, timed window comparator, transfer timer and transfer decision blocks of the monitor of FIG. 3.

Referring also to FIG. 9, AC voltage comparator circuit 244 comprises a high-limit voltage comparator U22, pins 5, 6 and 7 and a low-limit voltage comparator U22, pins 2, 3 and 1. High-limit comparator U22 receives the AC high-limit signal on the non-inverting input pin 5 and the AC sample signal on the inverting input pin 6. When the AC sample signal remains below the AC high-limit signal, the output at comparator U22 pin 7 remains a square wave synchronized in phase with the AC sample signal and the precision sine wave signal. FIG. 31(a), (c), (d) and (e) depicts this situation.

When the AC sample signal becomes greater than the AC high-limit signal, the output at comparator U22, pin 7 becomes a square wave 180° out of phase with the AC sample signal and the precision sine wave signal. FIG. 31(b) depicts his situation.

Low limit comparator U22, pins 1, 2 and 3 receives at pin 3 the AC sample signal on the nonthe AC high voltage limit signal. This is represented in FIG. 31(a), (c), (d) and (e).

Upon the phase of the output signal at pin 7 of the high comparator becoming reversed in phase to the squared precision sine wave, the output pin 3 of exclusive-OR gate U23 goes high and begins charging its associated timing circuit of transfer timers 248. This timing circuit comprises resistors R!21, R120, diode CR17 and capacitor C67 also tied to test point TP2. When the output pin 3 of exclusive-OR gate U23 has remained high for approximately three cycles of the AC sample signal, tD=3 cycles, or about 48 milliseconds, test point TP 2 attains a high level logic state to indicate that a transfer should occur due to an over voltage. The waveform TP2 in FIG. 31(b) represents this three cycle delay within the compressed time limits of one AC cycle of the AC sample signal for simplicity of explanation.

When the phase of the signal produced by the low voltage comparator U22, pin 1 stays in phase with the squared precision sine wave, exclusive-OR gate U23 pin 11 remains low to indicate that the voltage of the AC sample signal remains above the AC low voltage limit. The waveforms in FIGS. 31(a), (b), (c) and (e) depict this situation. When inverting input and receives the AC low-limit signal on the inverting input, pin 2. When the AC sample signal remains greater than the AC low-limit signal, the comparator U22, pin 1 produces a square wave signal represented in FIG. 31 (a), (b), (c) and (e), in phase with the AC sample signal and the precision sine wave signal. When the AC sample signal becomes less than the voltage of the AC low-limit signal, the low level comparator U22 pin 1 produces a square wave signal, represented in FIG. 31(d) that becomes 180° out of phase with the AC sample signal and precision sine wave signal.

The timed window comparator circuit 246 receives the precision sine wave signal at buffer U9, pin 6, the inverting input, to produce at the output pin 7 a square wave in phase with the precision sine wave signal. This squared precision sine wave signal passes to exclusive-OR gates U23, pin 2 and U23, pin 12. Exclusive-OR gate U23 pin 1 receives the output of the high comparator U22, pin 7, and when that signal remains in phase with the squared precision sine wave signal, the output pin 3 of exclusive-OR gate U23 remains at a low or zero logic level. A low or zero logic level thereof indicates that the AC sample signal remains below the signal of low-limit comparator U22, pin 1 becomes reversed in phase to the squared precision sine wave, the exclusive-OR gate U23, pin 11 goes high and starts charging its associated timing circuit of transfer timers 248.

Particularly, a high logic state at exclusive-OR U23, pin 11 causes test point TP3 to increase in voltage through action of diode CR15, resistor R114, capacitor and C66 alternatively resistor R115. Test point TP3 charges rapidly, typically in less than one millisecond to place a high level logic state at the input pin 12 of NOR gate U24. This indicates an under voltage condition depicted in FIG. 31(d).

In transfer decision circuit 250 and as is shown in FIG. 31, a high level logic signal at either of test point TP2 or TP3 indicating an under or over voltage condition produces a low level logic signal at the output pin 11 of NOR gate U24. This in turn produces through NOR gate U24 pins 8, 9 and 10, inverter U18 pins 2 and 15 and Schmidt trigger inverter U16 pins 1 and 2 a high level transfer signal indicating that the UPS device should go to the standby mode. A low level logic signal at both of est TP2 or TP3 produces a high level logic signal at the output pin 11 of NOR gate U24. This in turn produces through the described components a low level transfer signal indicating that the UPS device should go to the normal mode.

Low level signals at both, TP2 and TP3, allow capacitor C54 to charge to about +12 volts through resistor R92. A high level charge on capacitor C54 causes the low level transfer signal at inverter U16, output pin 2. One low level signal at TP2 or TP3 causes the output pin 15 of inverter U18 to go low, sinking charge and voltage from capacitor C54 to cause a low level signal at the input pin 1 of inverter U16. This causes a high lever transfer signal at inverter U16 output pin 2.

The active state of the Timer Disable Not signal to the base of transistor Q11 inhibits an indication of an otherwise apparent under voltage condition to test point TP3. The reason for the active state on the Timer Disable Not signal results from detection of a clipped AC voltage condition by circuit 252 that appears to be an under voltage condition to monitor 104. That active state turns on transistor Q11 to forward bias diode CR31 and sink to ground any charge collected on capacitor 66. This inhibition can occur on each cycle upon circuit 252 recognizing a clipped AC line occurrence.

Figure 11:
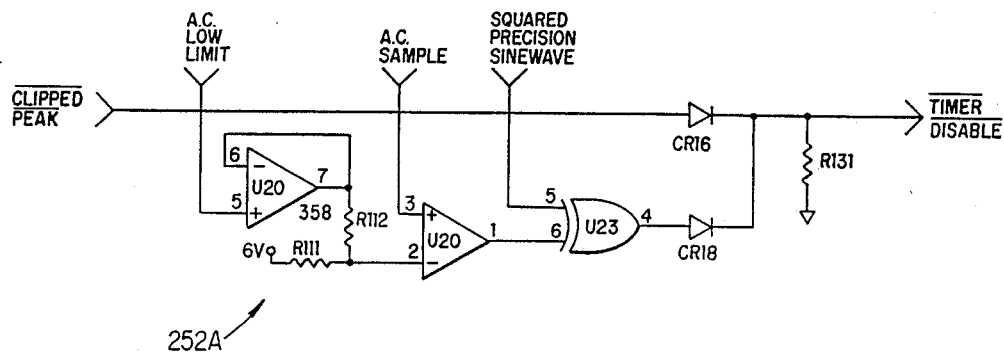
FIGS. 10 and 11 are circuit diagrams of the clipped AC line detector block of FIG. 3.

Referring also to FIG. 11 and FIGS. 32(a), (b), and (c), the clipped AC line detector circuit 252A operates to pass or block the Clipped Peak Not signal to form the Timer Disable Not signal. In FIGS. 32(a), (b) and (c), the Clipped Peak Not signal occurs as an active low state pulse registered with each and every high or low crest of the AC sample signal 270. Under normal conditions without clipping of the crest of the AC sample signal 270, the Clipped Peak Not signal becomes an active low for approximately 750 microseconds, that increases in width to about three milliseconds maximum, during a clipped AC sample signal condition.

Comparator U20 pins 5, 6 and 7 receive the AC low voltage limit signal and produces a lower voltage clipped limit signal to comparator U20 pin 2. Comparator U20 compares this lower voltage clipped limit with the AC sample signal at its non-invertin input pin 3 to produce a square wave at output pin 1, in the same manner as comparator U22 pin 1 in FIG. 9 provides after comparing the AC low voltage limit and AC sample signals at its pins 2 and 3. Exclusive-OR gate U23, pin 6 compares this square wave from comparator U20, pin 1 with the squared precision sine wave at kin 5 to produce a high or low state signal on its output pin 4 in a manner similar to that produced by exclusive-OR gate U23, pin 11 to FIG. 9 to indicate that the AC sample signal is above or below the clipped voltage limit.

When the AC sample signal remains above the clipped low voltage limit, the output pin 4 of exclusive-OR gate U23 remains low to enable the passage through diode CR16 of the Clipped Peak Not signal to make the Timer Disable Not signal. FIG. 32(a) and (b) depicts this case. When the AC sample signal goes below the clipped low limit voltage set by resistors R111 and R112 at comparator U20 pin 2, the signal output at exclusive-OR gate U23, pin 4 goes high to forward bias diode CR18, reverse bias diode CR16 and maintain the Timer Disable Not signal at a constant high level, shown in FIG. 32(C). The connection at the cathodes of diode CR16 and CR18 forms a wired-OR connection together with resistor R131 so that any one high at the anodes of diode CR16 and CR18 forces a logical high at the cathodes of both diodes.

The normal occurrence each cycle of the Timer Disable Not signal forces the test point TP3 low so that capacitor 46 cannot charge even if an under voltage condition becomes indicated from exclusive-OR gate U23 pin 11. See FIG. 32(b). Upon the AC sample signal falling below, the clipped voltage limit, the Clipped Peak Not signal becomes blocked and the Timer Disable Not signal remains at a logical high. This enables the test point TP3 to attain a logical high and indicate an under low voltage limit condition. This then effects the transfer to standby mode previously described.

Figure 10:
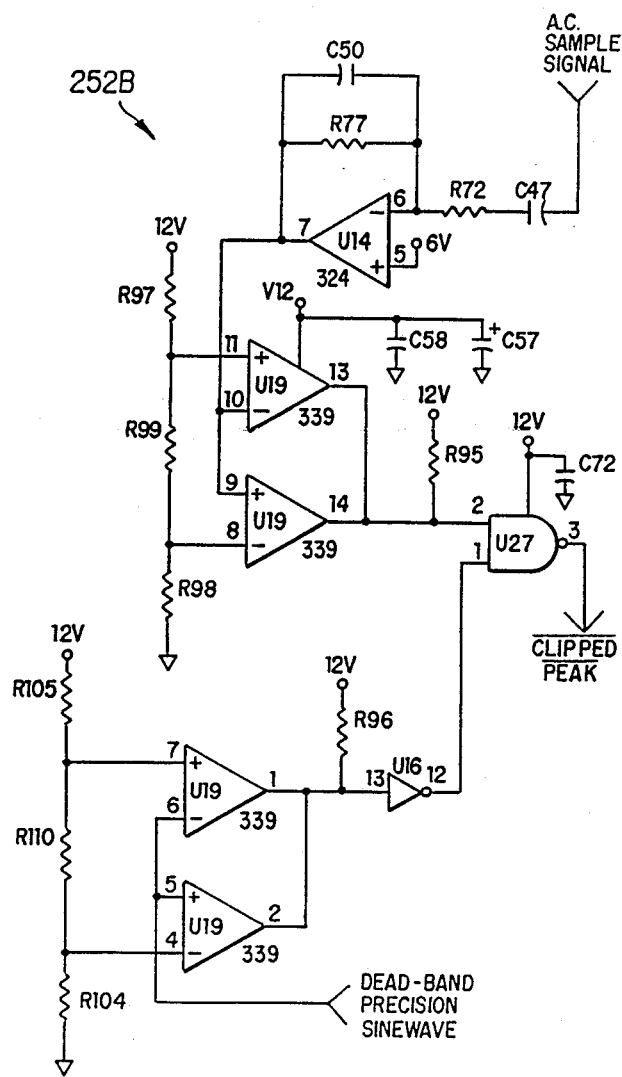
Figures 33, 34:
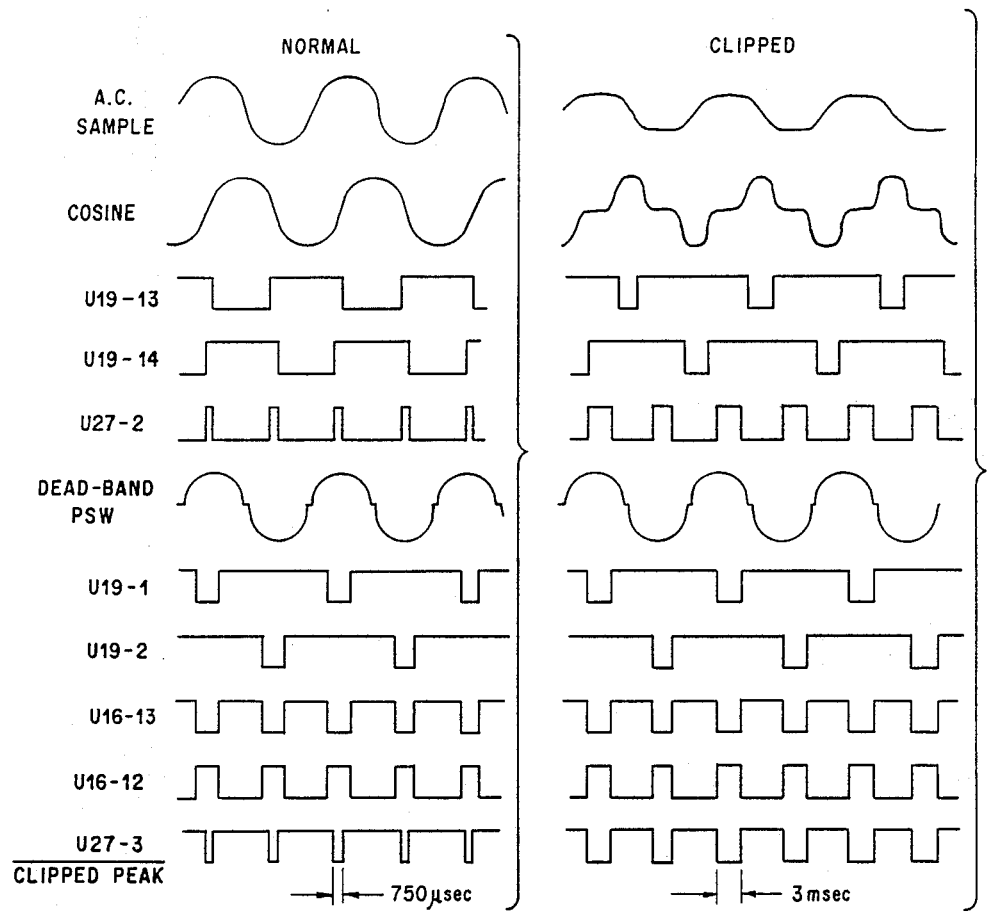
FIG. 33 is a timing diagram of idealized signals occurring in the clipped AC line detector block of FIG. 3 responding to an unclipped AC sample signal.
FIG. 34 is a timing diagram of signals occurring in the clipped AC line detector block of FIG. 3 responding to a clipped AC sample signal.

Referring to FIGS. 10, 33, and 34, the clipped AC input detector circuit 252B receives the AC sample signal and the dead-band precision sine wave signal to produce the Clipped Peak Not signal at the output pin 3 of NAND gate U27. Differentiator U18 pins 5, 6 and 7 together with capacitor C47, resistor R72, resistor R77 and capacitor C50 receives the AC sample signal and differentiates same to produce a cosine wave at its output pin 7 lagging 90° in phase from sine wave of the AC sample signal. The cosine wave output becomes applied to the inverting pin 10 of comparator U19 and the non-inverting pin 9 of comparator U19. A voltage divider comprised of resistors R97, R99 and R98, extending from +12 volts to ground provide substantially +8 volts DC to the non-inverting input pin 11 of comparator U19 and substantially +4 volts DC to the inverting pin 8 of comparator U19. The pulsed outputs of these two comparators at pins 13 and 14, see FIGS. 33, join together at the input pin 2 of NAND gate U27 with a pull-up resistor R95 to +12 volts to form high pulses substantially 750 microseconds wide centered at the slow voltage change crests of the AC sample signal or the fast voltage change portions of the cosine wave. This part of the clipped AC line detector forms a dV/dT detector of the AC sample signal. The width of these high pulses during the existence of a normal AC sample signal without clipped peaks, stays at approximately 750 microseconds.

Comparator U19, pins 4, 5 and 2 and comparator U19 pins 6, 7 and 1 receive the dead-band precision sine wave and DC voltage levels of approximately +8 and +4 volts from divider resistors R105, R104 and R110 to produce a uniform train of pulses at the input to Schmitt trigger inverter U16, pin 13 tied to +12 volts through resistor R96. These pulses substantially are centered at the crest of the dead-band precision sine wave and produce a continuous train of high pulses of approximately 3 milliseconds width, centered at the crests or slow voltage change areas of the precision sine wave signal, at the output pin 12 of Schmitt trigger inverter U16. The combination of these two signals at pins 1 and 2 of NAND gate U27 results in the Clipped Peak Not signal at pin 3 thereof. The width of the pulses of the Clipped Peak Not signal increases from a normal condition of 750 microseconds wide to substantially 3 milliseconds wide upon occurrence of a clipped AC sample signal, which increases the period in which there is a fast change of voltage with respect to time in the cosine wave applied to comparator U19 at pins 10 and 9 thereof.

Figure 12:
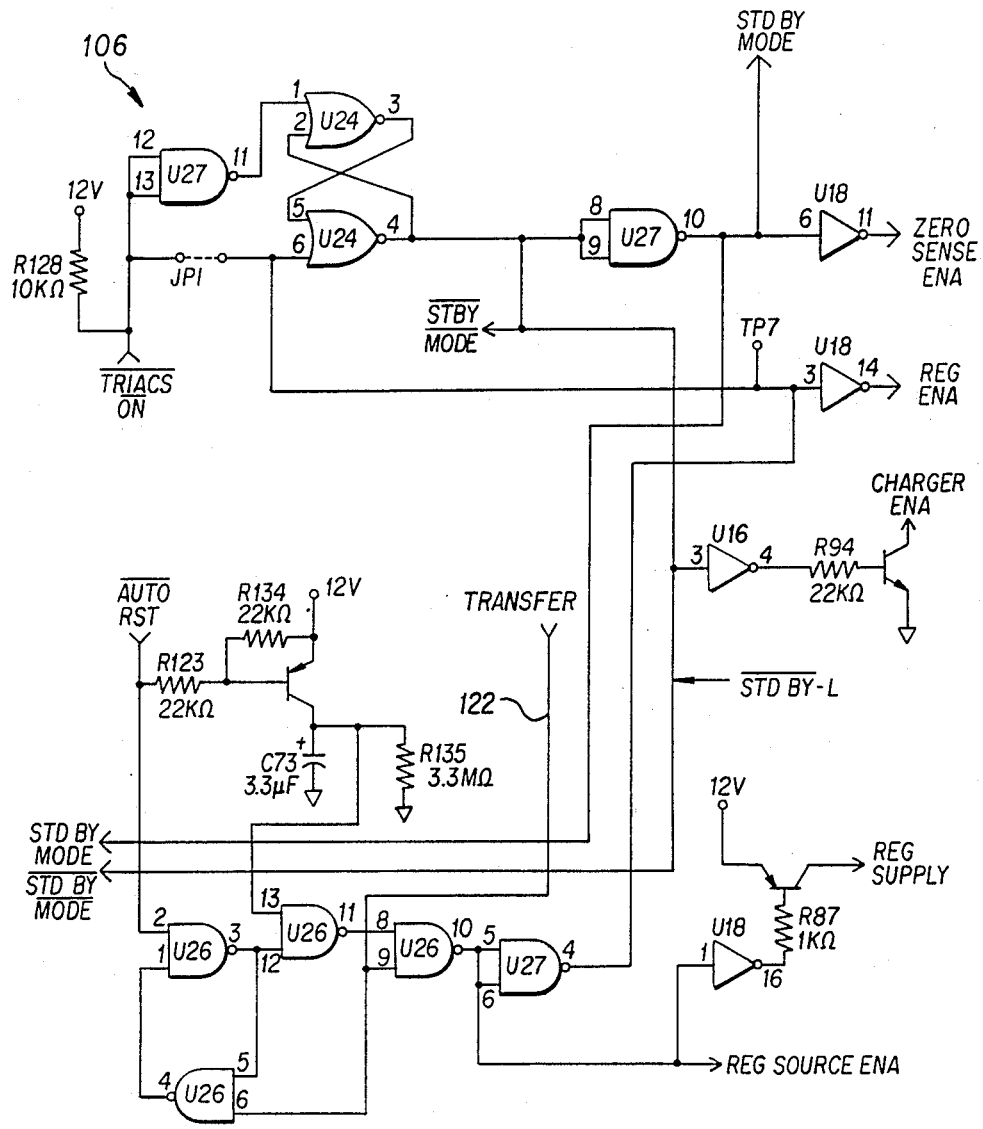
FIG. 12 is a circuit diagram of the line-standby transfer control block of FIG. 3.

In FIG. 12, normal-standby transfer sequence circuit 106 receives the transfer signal on lead 122 from the monitor 104 to sequence the enablement and disablement of the regulator 50 and invertor 56.

An Auto Reset Not signal produces an active low to resistor 129 turning on transistor Q13 tied to +12 volts through resistor 134. This charges capacitor C73 to +12 volts with a parallel connection to ground through resistor R135. The active low Auto Reset Not signal at NAND gate U26 pin 2 drives the output pin 3 high, and in NAND gate 26 the output pin 11 goes low due to the two highs at its input pins 13 and 12. This low drives NAND gate U26 output pin 10 high to switch on the regulator supply power from +12 volts through transistor Q7, resistor R87 and inverter U18 pins 1 and 16. NAND gate U27 connected as an inverter outputs at pin 4 a low to produce the active high Regulator Enable signal through inverter U18 pins 3 and 14 and to drive output pin 4 of NOR gate U24 to a high state through its input pins 6 and 5 being low. NOR gate U24 pin 4 going high produces a high logic signal on the Standby Mode Not and through NAND gate U27 pins 8, 9 and 10 connected as an inverter produces an active high on the signal Standby Mode. This also drives the signal Zero Sense Enable low through inverter U18 pins 6 and 11.

The Auto Restart Not signal becomes active low when the AC input returns after the inverter has become exhausted and becomes generated for about five cycles of the AC input to start the UPS device 40 on AC input operation. With AC input voltage occurring normally, the transfer signal takes a low state to maintain the output of NAND gate U26 pin 10 at a logical high maintaining all of the signals downstream therefrom at their just described logic states.

At NAND gate U26 pin 6, the low transfer signal forces the output pin 4 thereof high, and when the Auto Reset Not signal becomes high after five cycles of the AC input output pin 3 of NAND gate U26 goes low to set that latch with NAND gate U26 pin 5. Stable operation in the normal mode continues. A low level Charger Enable Not signal occurs through transistor Q10 turning on in conjunction with resistor R94 and inverter U16, pins 3 and 4, in response to the Standby Mode Not signal.

When the monitor detects a low AC line voltage condition, it produces a high logic state on the Transfer signal. This high at NAND U26, pin 9 with the high at pin 8 produces a low level signal on the output pin 10. This turns off the power to the regulator supply by turning off transistor Q7 through resistor 87 and inverter U18, pins 1 and 16. NAND gate U27, connected as an inverter, output pin 4, goes high to turn off the Regulator Enable signal through inverter U18, pins 3 and 14 and to produce a high at NOR gate U24 pin 6. Output pin 4 of NOR gate U24 goes low to produce the active low state of the Standby Mode Not signal, through inverter U27, pins 8, 9 and 10 to make the active high Standby Mode signal, and to switch off the Zero Sense Enable signal through inverter U18, pins 6 and 11. The Triacs On Not signal from the regulator then goes high, to indicate that the regulator has disconnected the line from the first primary winding 58, and through NAND U27, pins 12, 13, and 11 connected as an inverter, forces the output of NOR gate U24 pin 3 to take a high state latching output pin 4 of NOR gate U24, low through its input pin 5 being high. These two cross-connected NOR gates U24 pins 1, 2, 3 and 4, 5, 6 thus become set in the standby mode state.

In summary, high state on the transfer signal thus disables the regulator first and then turns on the standby mode signals. The triacs going off signal from the regulator card sets a latch to maintain the sequence circuit in the standby mode of operation with the inverter running.

When the AC input returns before exhaustion of the standby power source, the sequence circuit 106 first enables the regulator and waits for the signal Triacs On Not to become active low before producing the inactive states of the Standby Mode and Standby Mode Not signals. Specifically, a low state Transfer signal on lead 122 forces the output pin 10 of NAND gate U26 high to turn on the power to the regulator supply through transistor Q7. The output of NAND gate U27, pin 4 then goes low to produce the active state of the Regulator Enable signal through inverter U28 pins 3 and 14. The low on NOR gate U24, pin 6 does not reset the latch, but when the Triacs On Not signal becomes active low, NOR gate U24, pin 1 goes high forcing its output pin 3 to go low and the input pin 5 of NOR gate U25 also goes low. With two low inputs thereto, its output pin 4 goes high resetting the latch, causing the Standby Mode Not signal to go high, the Standby Mode signal to go low and producing the active state of the Zero Sense Enable signal through inverter U18, pins 6 and 11. The UPS device 40 thus returns to AC input operation having turned the inverter off after the regulator resumed operation.

During the standby mode, the Charger Enable signal goes low through operation of transistor Q10, resistor R94 and inverter U16 pins 3 and 4

Figure 13:
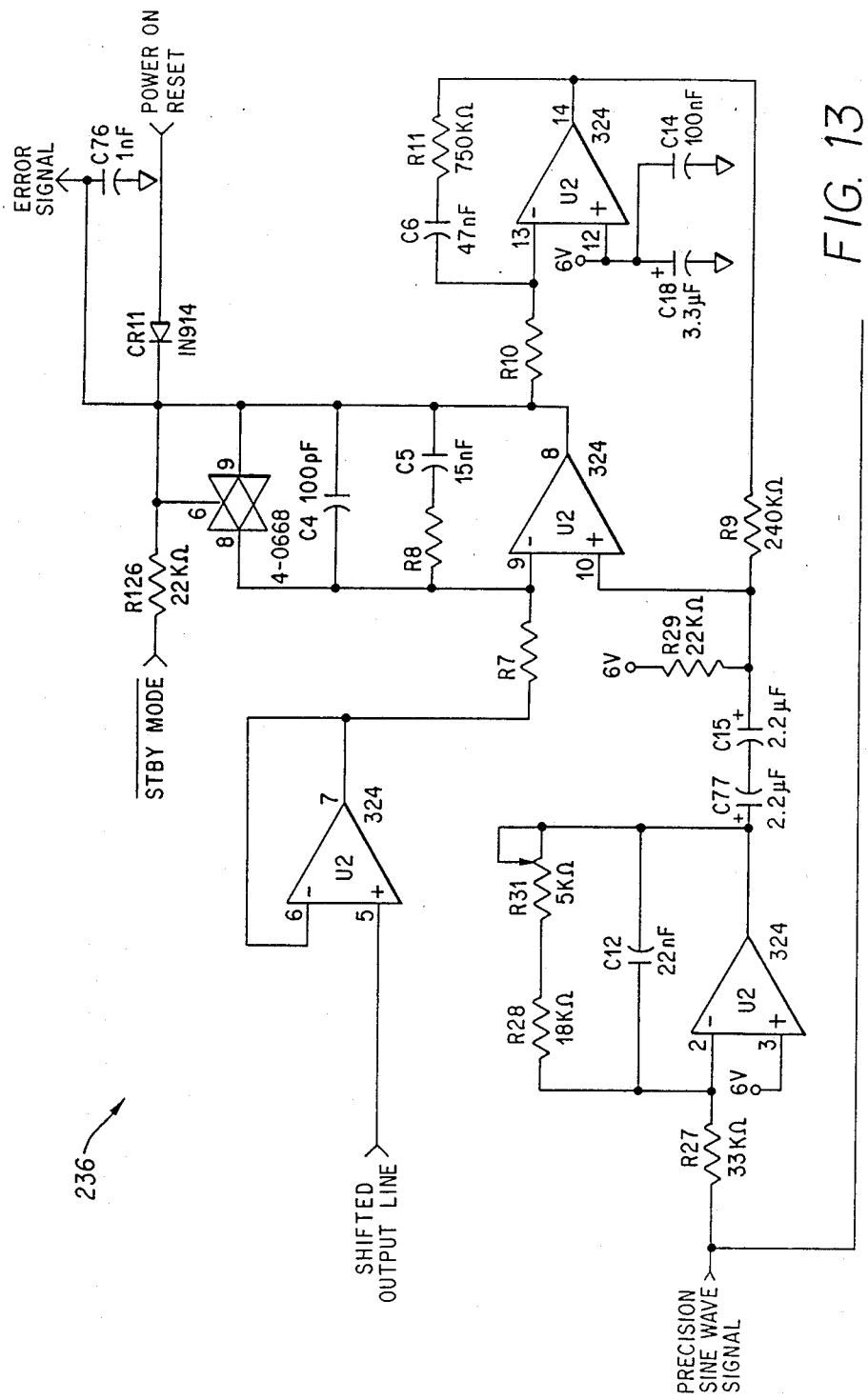
FIG. 13 is a circuit diagram of the inverter error amplifier feedback block of FIG. 3.

In FIG. 13, the inverter feedback circuit 236 receives the Precision Sine Wave signal and the Shifted Output Line signal to produce an Error signal to the error signal comparator 192 in the inverter 56. Voltage amplifier U2 pins 1, 2 and 3 supply a desired voltage amplitude and phase shifted precision sine wave reference to the non-inverting input pin 10 of error amplifier U2. The Shifted Output Line signal passes through follower U2 pins 5, 6 and 7 and resistor R7 to the inverting input pin 9 of error amplifier U2. The remainder of the components comprise a circuit to make the waveform of the signal at pin 9 from the Shifted Output Line the same as the shifted precision sine wave reference at pin 10 of error amplifier U2 to effect voltage regulation and sine wave synthesis at the inverter output. Upon a Power On Reset or an inactive state of the Standby Mode Not signal, transmission gate U13 turns on to short error amplifier U2, pin 8 to pin 9. In this condition, the Error signal equals the sine reference at U2, pin 10.

Figure 14:
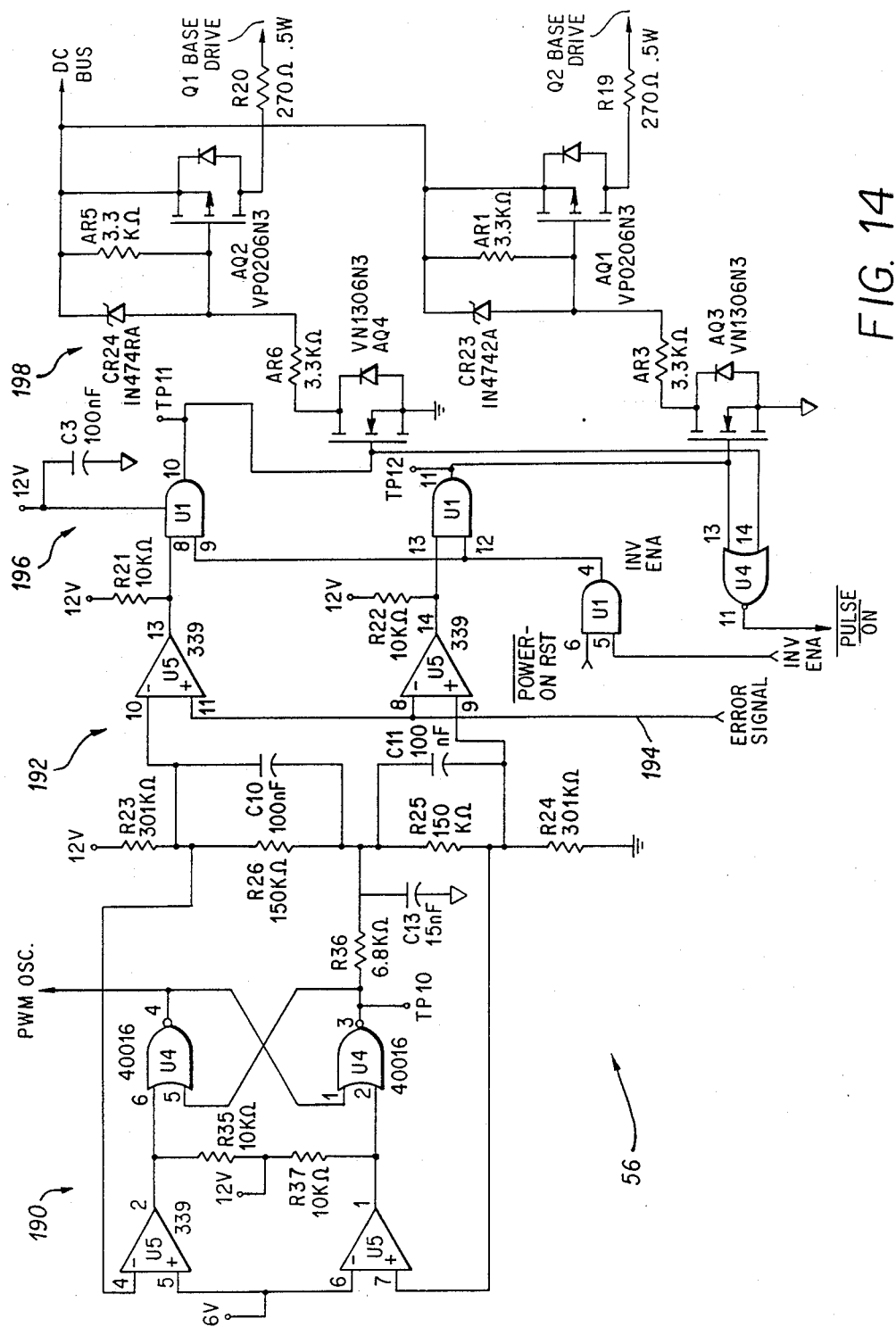
FIG. 14 is a circuit diagram of the pulse width modulation 7 kilohertz oscillator, error signal comparator, inventer enable and pulse width modulation drivers blocks of FIG. 3.
Figure 15:
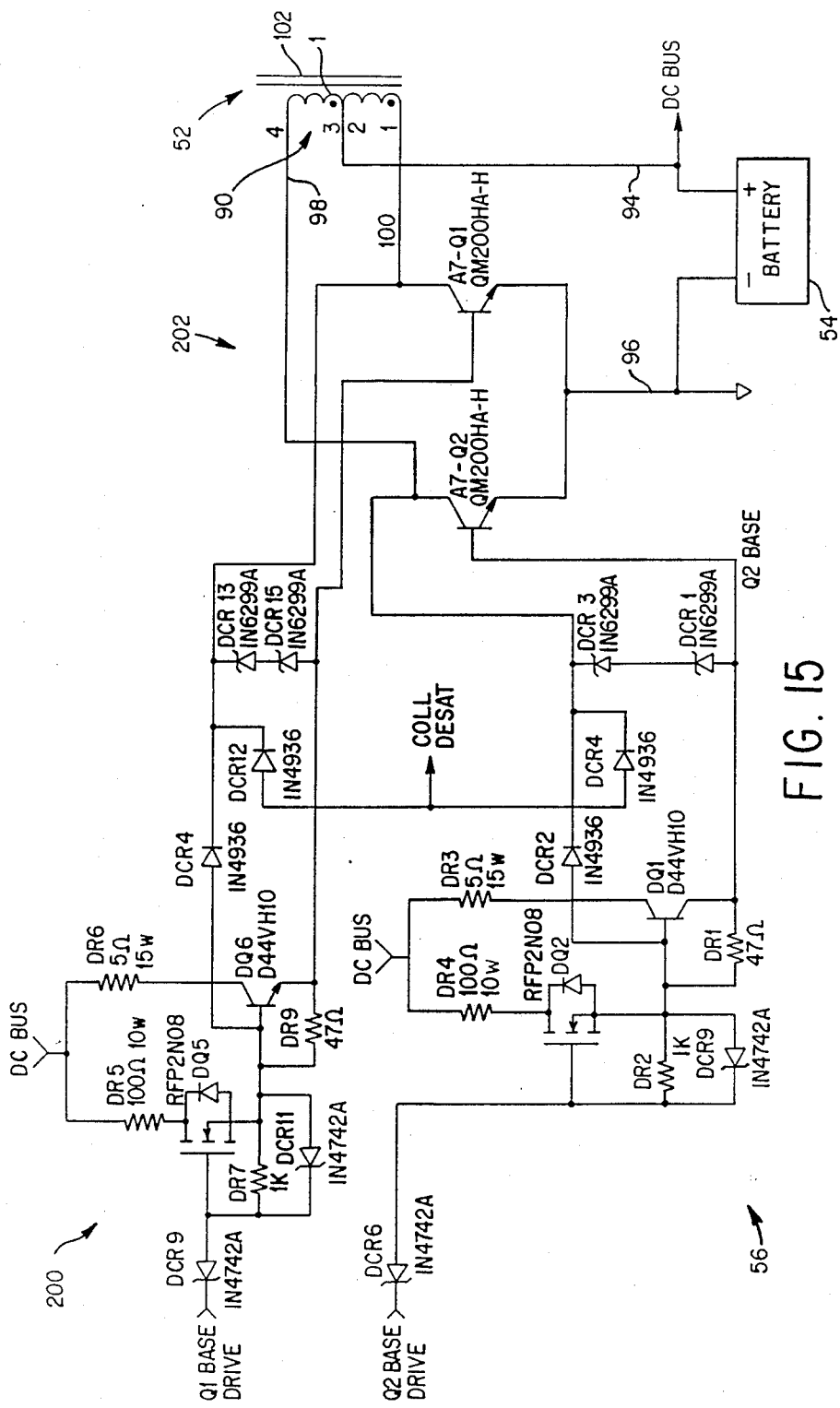
FIG. 15 is a circuit diagram of the power drivers and push-pull transistors blocks and the inventer second primary winding of the transformer of FIG. 3.

In FIGS. 14 and 15, inverter 56 produces pulse width modulated pulses into the second primary windings 90 of transformer 52. These pulses occur upon the inverter being enabled in response to the previously described Error signal.

In FIG. 14, a 7 kilohertz oscillator 190 produces at test point TP10 a 7 kilohertz square wave signal that swings between 0 and 12 volts. Through resistor R36 and capacitor C13, which form a triangle integrator, this signal becomes a triangular wave swinging between +4 an +8 volts around a center offset of +6 DC into the voltage divider comprising resistors R23, R26, R25 and R24. This triangular waveform becomes level shifted in the voltage divider to present to comparator U5, pin 10, the inverting input, a triangular wave extending from +6 to +10 volts and to provide to the non-inverting input pin 9 of comparator U5 a triangular waveform swinging from +2 to +6 volts. Both of these triangular waveforms appearing at comparators U5, pin 10 and pin 9 remain in phase with one another. Comparators U5 at the non-inverting input pin 11 and the inverting input pin 8 receive the Error signal from the inverter feedback circuit 236 with the two comparators U5 pins 10, 11 and 13 and 8, 9 and 14 forming the pulse width modulator comparator 192. The outputs of these two comparators will form a logical high when the magnitude of the error signal is greater than the triangular waveform and will form a logical low when the magnitude of the triangular waveform is greater than the error signal.

The inverter enable circuit 196 comprises three AND gates that receive an Inverter Enable signal to be described and a Power-on Reset Not signal. While the Power-on Reset Not and Inverter Enable signals remain high, output pin 4 of AND gate U1 remains high enabling the output pins 10 and 11 of AND gates U1 to switch high or low depending upon the state of the inputs at their pins 8 and 13, respectively. A high at AND gate U1, pin 10 indicates that the A7-Q1 in FIG. 15 power transistor should conduct to sink current through the second primary winding 90 while a logical high at AND gate U1, pin 11 indicates that the transistor A7-Q2 should conduct to sink current through the second primary winding. Transistors A7-Q1 and A7-Q2 are arranged in a push-pull topology so that only one of these power transistors is sinking current through the second primary winding at any one time. This alternation of pulses results from the logical high states occurring at test points TP11 and TP12. A logical high at either of these two test points TP11 or TP12 produces an active low state on Pulse On Not signal through NOR gate U4 pins 13, 12 and 11.

PWM drivers 198 comprise two parallel circuits, one for each of the two power driver transistors. A description of one will be a description of the other. A logical low at the drain of transistor AQ4 draws current to ground therethrough. This turns on transistor AQ2 to pass current therethrough to resistor R20 and the Q1 Base Drive signal.

In FIG. 15, power drivers 200 also include two parallel identical circuits so that a description of one is a description of the other. Base drive current appearing at the Q1 Base Drive signal turns on transistor DQ5. This in turns sources current to the base of transistor DQ6, which in turn sources current to the base of power transistor A7-Q1. This turns on transistor A7-Q1 to sink current through leads 1 and 2 of the second primary winding 90 from battery 54. Resistor DR6 at the collector of transistor Q6 limits the base drive current to transistor A7-Q1 to approximately 6 amperes. The associated resistors, diode and zenor diodes in the PWM driver circuits and the power driver circuits provide the necessary bias, protection and voltage limits for desired operation of these circuits.

Figure 16:
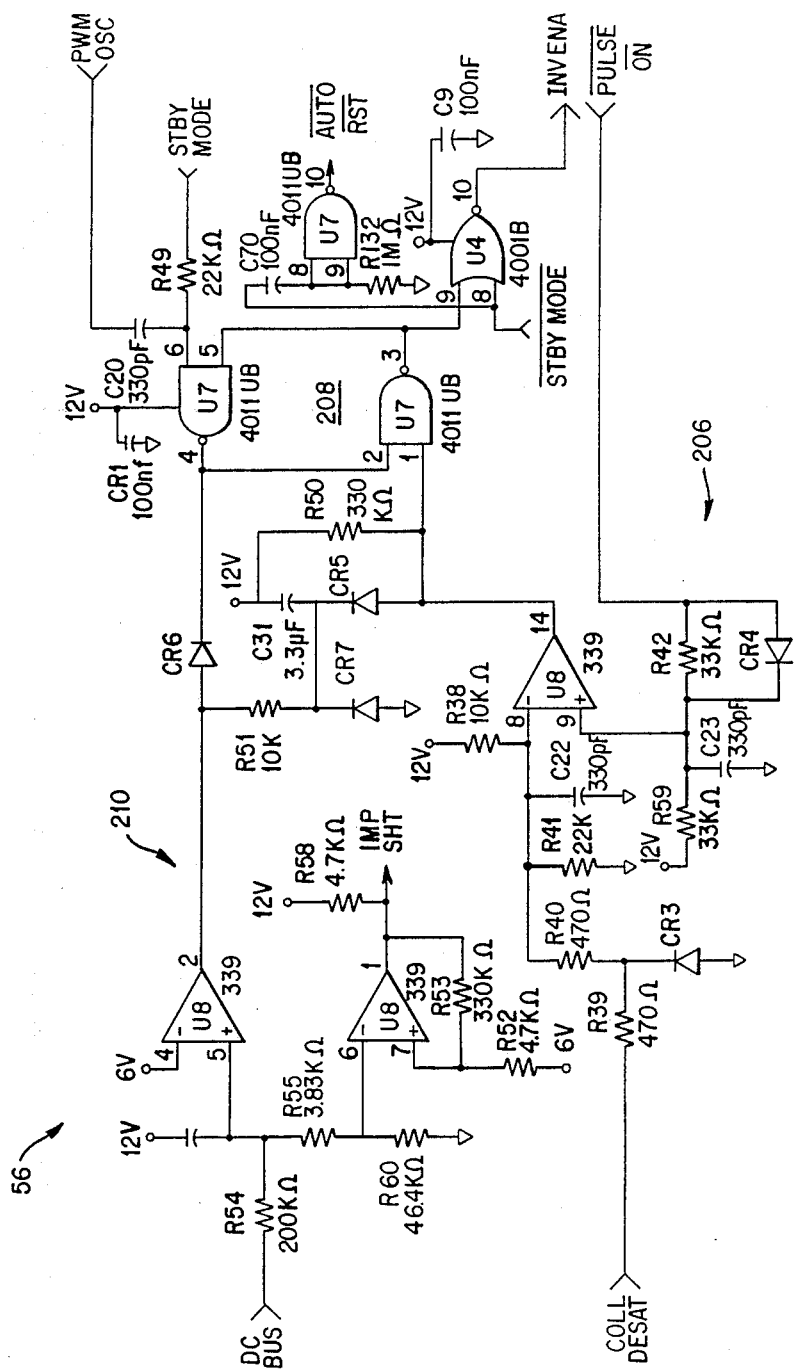
FIG. 16 is a circuit diagram of the low battery shutdown, push-pull transistor desaturation and inventer enable latch blocks of FIG. 3.

In FIG. 16, the inverter 56 comprises the low battery shutdown circuits 210, the push-pull transistors desaturation circuits 206 and the inverter enable latch 208. During regular operation of the UPS device 40 in the normal mode, the Standby Mode signal remains low and the Standby Mode Not signal remains high. Through NOR gate U4, pins 8 and 10 the Standby Mode Not signal being high produces a low or inactive state at the signal Inverter Enable. This disables operation of the inverter previously described in FIG. 14. With the inverter producing no pulses, the Pulse-On Not signal remains high and the Collector Desat signal remains high. Through comparator U8, pins 9, 8 and 14, this produces a high level signal in latch 208 at NAND gate U7, pin 1. The low condition in the Standby Mode signal at NAND gate U7, pin 6 forces the output pin 4 high to NAND gate U7, pin 2. Two highs at its input pins 1 and 2 forces the output thereof at pin 3 to take a low state latching the two NAND gates in a stable normal mode state. This also supplies NOR gate U4, pin 9 with a low signal preparatory to the Standby Mode Not signal going low to produce a high level Inverter Enable signal at pin 10 thereof.

The DC bus connects to comparators U8 pins 6 and 5. Pins 2 and 1 normally remain high to indicate sufficient DC voltage, and thereby electrical power, in the standby power source battery 54 to supply electrical power through the transformer to the load terminals 46, 48. During standby mode inverter operation, when the battery voltage drops to a fixed point determined by divider resistors R55, R54 and R60 comparator U8, pin 1 produces a high level signal to indicate an impending shutdown of the inverter standby power source. Typically, this will allow approximately one more minute after the impending shutdown signal becomes active for continued supply of electrical power from the battery 54. Upon the battery attaining a lower DC voltage at which it substantially becomes unable to supply further electrical power, comparator U8 pin 2 takes a low state to forces latch 208 to a state to be described. Substantially comparator U8, pin 2 going low force, the signal Inverter Enable to an inactive low state.

In any event, during normal mode operation, a low battery shutdown condition has no effect on the latch 208 or Inverter Enable signal.

The PWM Oscillator signal, which is a square wave changing states at 7 kilohertz, also has no effect on latch 208 in the normal mode.

In the standby mode, the Standby Mode signal goes high and the Standby Mode Not signal goes low. The Standby Mode Not signal going low together with the low from latch 208 to NOR gate U4, pin 9, causes the output pin 10 thereof to go high to enable the inverter operation. The Standby Mode signal goes high to enable the latch 208 to make whatever changes that are effected upon it with the PWM oscillator signal acting to attempt to reset latch 208 at every cycle of its 7 kilohertz signal.

With the inverter running, the Pulse On Not signal will pulse to a low state each time one of the power transistors is turned on. These pulses couple to the comparator U8, pin 9, non-inverting input, and as long as the Collector Desaturation signal coupled to comparator U8, pin 8, the inverting input, remains below the voltage of comparator U8, pin 9, the output of comparator U8 pin 14 will remain high indicating that there is no collector desaturation in the power transistor. When a collector desaturation in either of the power transistors occurs, the output of comparator U8, pin 14 will go low to NAND gate U7, pin 1. This will force the output pin 3 high to force the Inverter Enable signal low through NOR gate U4, pins 9 and 10, temporarily disabling or turning off the inverter and its drive transistors.

This also will flip the latch 208 through NAND gate U7, pins 5 and 6 being high and forcing output pin 4 low to force the latch 208 to assume a normal mode set of logic states. With the Inverter Enable signal taking an inactive state, the Pulse On Not signal will remain high, and with the transistors turned off, the collector desaturation signal will go and remain high. Pin 9 of comparator U8 would be at a higher voltage than pin 8, forcing the output pin 14 to attain a high state enabling latch 208 to flip to the standby mode set of logic states. At the next negative PWM oscillator signal, NAND gate U7 pin 6 will go low to force the output pin 4 high. This will flip the latch 208 through the two high signals at pins 1 and 2 of NAND gate U7 forcing output pin 3 low again to produce an active high at the Inverter Enable signal through NOR gate U4, pins 8, 9 and 10.

The Inverter Enable signal thus can be latched to an inactive state in the standby mode at each pulse of the power transistors in which their collectors come out of saturation. Through the PWM oscillator signal, the latch 208 returns to the standby mode inverter operation state for the next occurrence of the pulse width modulated signals in the inverter.

In the standby mode the occurrence of the low battery shutdown signal from output pin 2 of comparator U8 causes the Inverter Enable signal to take an inactive state after three cycles. This delay occurs through charging capacitor C31 in conjunction with resistors R50 and 51, diodes CR5, CR7 and CR6 tied to +12 volts and pin 1 of NAND gate U7.

Figure 17:
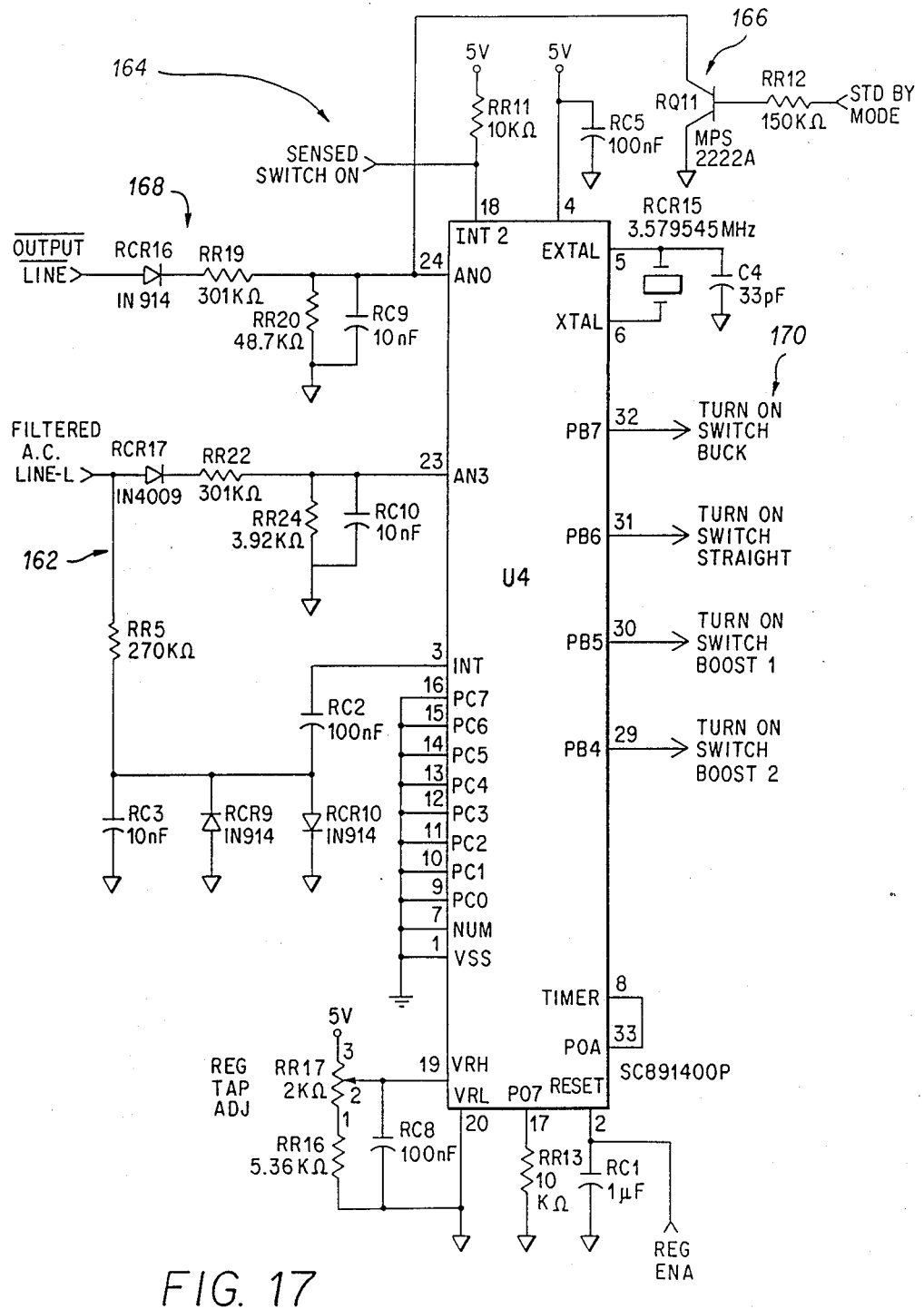
FIG. 17 is a circuit diagram of the regulator, disable and buffer blocks of FIG. 3.

In FIG. 17, regulator controller 164 comprises an 8-bit microcomputer unit U4 with analog to digital converter. The Output Line Not signal passes from transformer 66 to buffer 168 to effect a half wave rectification and a filtering in diode RCR16, resistor RR19, resistor RR20 and capacitor RC9. Therefrom it passes to controller U4, pin 24, which is an input port. A disable circuit 166 comprising resistor RR12 and transistor RQ11 receives the Standby Mode signal and in the active state pulls pin 24 of controller U4 to ground to disable the regulator from seeing any voltage from the Output Line Not signal. The microprocessor U4 expects to see the Output Line Not signal at zero volts when it turns off all of the switches 176 connecting the AC input to the first primary winding. If it sees the AC output voltage applied by the inverter to the load terminals 46 and 48, it assumes a malfunction occurred; clamping pin 24 to zero volts in the standby mode of operation avoids this problem.

The Filtered AC Line-L signal passes through buffer circuit 162 to pin 23 that is an input port of the controller U4. Buffer circuit 162 comprises diode CR17 that performs a half wave rectification and resistors RR22, RR24 and capacitor RC10 filter the signal passing to the controller U4.

Resistor RR5, capacitors RC3 and RC2 and diodes RC9 and RC10 provide a signal from the Filtered AC Line-L signal to the pin 3 of controller U4 for determining the zero crossing detection of the AC input signal. In response to the voltages received at its pins 23 and 24, the controller determines that one of the four taps to the first primary winding of the transformer should be selected to maintain the load voltage within desired specifications. This determination occurs internal of commercially available, which can be such as a Motorola MC 6805R2 integrated circuit, controller U4 through any software program desired and contained within the ROM and RAM portions of the circuitry therein. The effect of this determination results in one of the four output signals on pins 29, 30, 31 or 32 taking an active high state to turn on one switch 176. These four signals earlier were identified as being on leads 170. In particular, they are turn-on switch BUCK, turn-on switch STRAIGHT, turn-on switch BOOST-1 and turn-on switch BOOST-2. In order to avoid turning on a new switch prior to a previously actuated switch turning off, he controller U4 waits until it receives a sensed switch-on signal taking an inactive low state at pin 18 before forming an active state on any of the signals on leads 29–32.

Controller circuit 164 also includes a regulator tap adjustment circuit comprising variable resistor RR17, fixed resistor RR16 and capacitor RC8. These components connect to pins 19 and 20 of controller U4 that respectively set the high reference and low reference voltages for determining the taps to be energized. The remaining resistors, capacitors and crystal operate as filter and biasing components for proper operation of controller U4. Controller U4 becomes enabled through the active state of the Regulator Enable signal appearing at pin 2 thereof; an inactive low condition at this signal effects a reset of the controller microprocessor circuitry.

Figure 18:
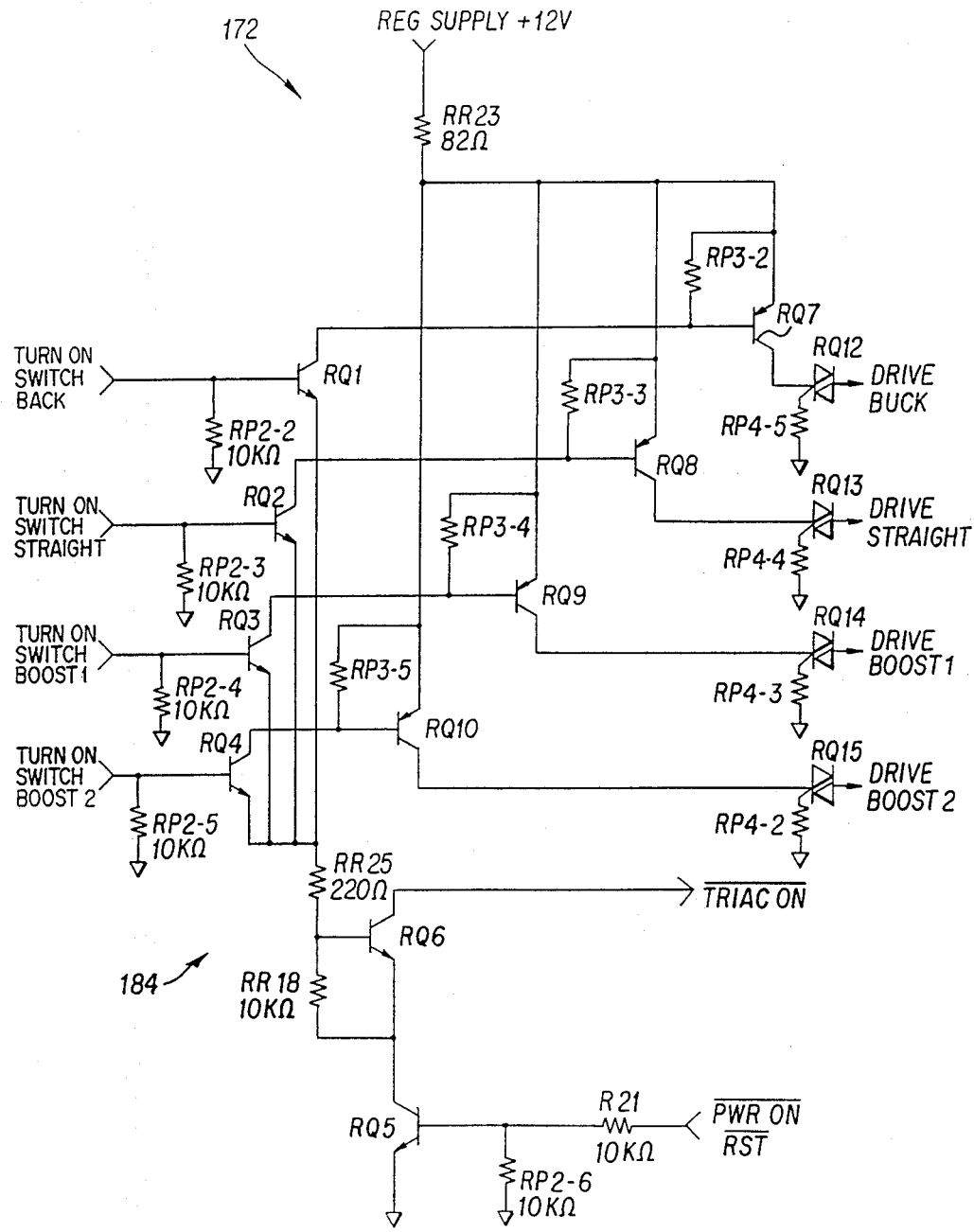
FIG. 18 is a circuit diagram of the drivers and driver or sense blocks of FIG. 3.

In FIG. 18, driver circuits 172 comprise two-stage amplification of the turn-on switch signals to produce drive signals to each of the four tap switches. With identical components in each of the four circuit paths, a description of one effects a description of all.

A logical high at the Turn On switch BUCK signal to the base of transistor RQ1 conducts current therethrough to circuit ground, through the driver-on sense circuit 184 and the power-on reset circuit comprising transistor RQ5 and resistors R21 and RP2-6. With transistor RQ1 sinking current, transistor RQ7 conducts to source current to small triac RQ12 having its gate tied to ground through resistor RP4-5. This sources current from the regulated supply +12 volts through RR23 to the drive BUCK signal. The regulator supply +12 volts continues in existence the entire time that the UPS device 40 remains in the normal mode.

The driver-on sense circuit 184 comprises resistors RR25 and RR18 biasing transistor RQ6. Whenever any one of the four turn-on switch signals becomes active to drive a tap switch, the base of the transistor RQ6 becomes forward biased to turn on same and to drive the Triac On Not signal to a logical low state.

The triac RQ12 typically has a low capacitance to minimize coupling into the gates of the power triacs any fast dV/dT occurring at the main terminals, MT1 and MT2, of the power triacs. This improves the noise performance of the main triac switches to reduce the sink or source current at the triac gates.

Figure 21:
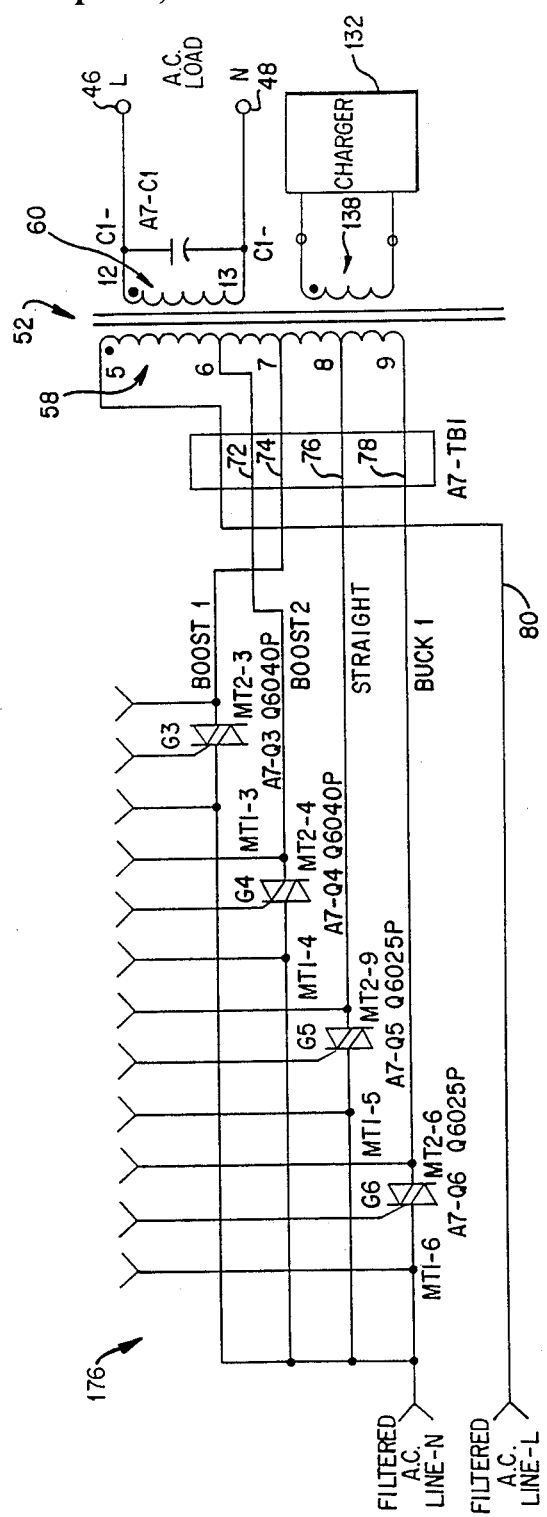
FIG. 21 is a circuit diagram of the switches block, first primary winding, secondary winding and charger winding of the transformer of FIG. 3.

Referring to FIGS. 19 and 21, the snubber circuits 174 comprise four parallel diode, capacitor and resistor arrays connected to the gate and either side of the triac switches. Because the four arrays are identical, a description of one effects a description of all. The Drive Buck signal appears at the anode diode SCR1 and is connected to the gate of the triac, A7-Q6.

Referring also to FIG. 21, the triac switch A7-Q6 has a gate lead C6 connected between the diode SCR1 and capacitor SC2 while MT1 of the triac connects to the other end of SC2: this produces a fitter for the gate of the triac. The phase side MT1- 6 of this triac connects to capacitor SC1 while the transformer side of this triac connects to SR1: SC1 together with SR1 comprise a snubber for the triac. The sense Buck signal is connected to MT2 of the triac.

The switches 176 comprise the four triacs A7-Q6, A7-Q5, A7-Q4 and A7-Q3 having connections just described. All four triacs are connected in parallel to the Filtered AC Line-N signal received from the AC input filter 160 and to the four tap leads 72, 74, 76 and 78 to the transformer first primary winding 58. The Filtered AC Line-L signal from the AC input filter connects to the other end of the first primary winding 58 and is carried on lead 80. Note that because of the parallel connection of the four triacs A7-Q6, A7-Q5, A7-Q4 and A7-Q3, that only one triac should conduct at any one time. If two triacs turn on simultaneously, they effect a circuit loop through the transformer first primary winding with no impedance therein that could cause the triacs to overload and fail.

Figure 22:
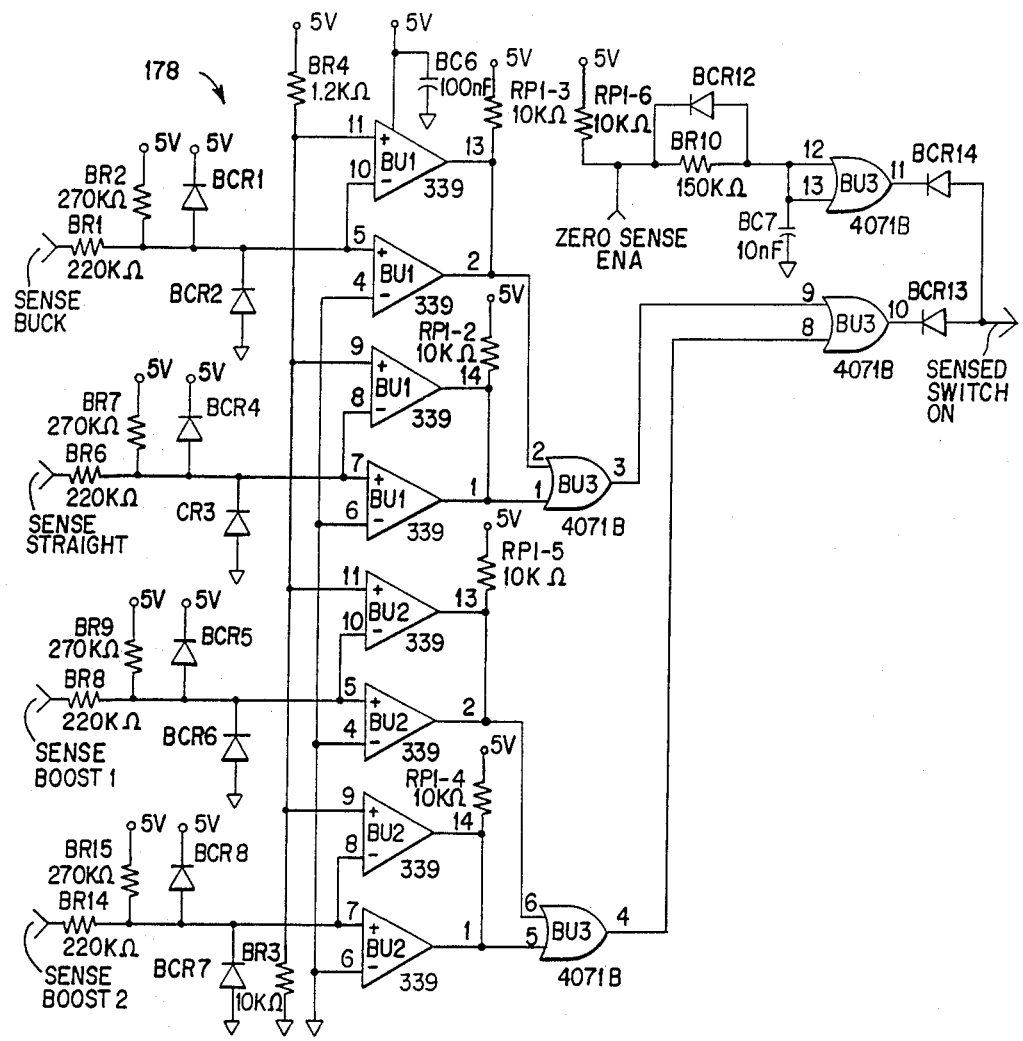
FIG. 22 is a circuit diagram of the switch on sense and disable blocks of FIG. 3.

In FIG. 22, the switch-on sense circuitry 178 receives through the four sense signals the voltage appearing on the transformer side of the triac switches. When any one of the triacs is conducting, both sides of the triac appear at the AC input neutral voltage level, which represents circuit ground of the UPS device 40. When one triac switch remains conducting, or turned on, output pin 10 of OR gate U3 produces a logical high state. Through reverse biased diode CR13, this produces a logical high at the Sensed Switch On signal previously described in FIG. 17 going to controller U4.

The Zero Sense Enable signal, which substantially is the signal Standby Mode Not, pulls the Sensed Switch On signal low while the supply remains in the standby mode. This prevents the controller U4 from seeing the standby AC output voltage supplied to the load terminals, which is coupled through the transformer back into the first primary winding and the winding side of the triacs, from interfering with proper operation of the controller U4. This coupled power makes the triacs appear to be turning on and off on each PWM pulse of the AC cycle and pulses the Sensed Switch On signal. This Zero Sense Enable circuit disables the Sensed Switch On circuitry 178 from operating during the standby mode.

Referring specifically to the Sense Boost-2 signal, the operation of the circuitry related to that signal best can be understood by considering that when the triac switch remains turned on to connect the Boost-2 tap of the transformer to the Filtered AC Line-N, the voltage appearing across the triac on the transformer side of the triac and at the input to resistor BR14 will be +/−1.5 volts. The neutral side of the triac is the system's circuit ground with the +/−1.5 volts being the voltage drop across the fully conducting triac on positive and negative cycles of the AC input voltage. When the triac ceases conducting and blocks passage of electrical current therethrough, the voltage at the input of resistor BR14 will be the voltage reflected from the transformer thereto ad will be substantially the a high AC line voltage.

Resistors BR14 and BR15 form an attenuator for the voltage level of the Sense Boost-2 signal and offset same to substantially 2.25 volts above ground. Diode BCR8 clamps the voltage from the two resistors at no more than 5.7 volts, the 0.7 volts being the forward bias voltage drop across the diode and diode BCR7 clamps that voltage to be no less than −0.7 volts. This attenuated voltage appears at the non-inverting input pin 7 of comparator BU2 and the inverting pin 8 of comparator BU2. The inverting input of comparator BU2, pin 6 connects to ground while the non-inverting input of BU2, pin 9 connects between a voltage divider resistors BR4 and BR3 between 5 volts and ground to set a voltage of 4.6 volts thereto. Thus while the attenuated Sense Boost 2 signal remains between ground and 4.46 volts, the output pins 1 and 4 of comparators BU 2 remain high to indicate that the Sense Boost 2 signal represents a switched-on and conducting triac. When the attenuated Sense Boost-2 signal exceeds these limits of 4.46 volts and ground, the respective outputs of comparators BU2 pins 1 and 14 will go low to indicate the triac switch remains non- conductive. Any one high from the comparators BU1 and BU2 pass through the OR gates BU3 pins 1, 2, and 3, 4, 5 and 6, and 8, 9 and 10 to indicate that a triac remains conductive.

In operation, regulator U4 in FIG. 17 outputs a signal turning off the one triac switch it previously had activated. The controller U4 then waits for the Sensed Switch On signal to become low to indicate that all of the triacs or any one of the triacs previously conducting has turned-off. The triacs will turn themselves off after removal of the gate signals when the line current passes through zero in its regular sine wave pattern. After the Sensed Switch On signal becomes low to indicate that all or one of the triacs previously conducting has turned off, the controller U4 then can output an active state on the desired Turn On Switch signal to energize and make conductive the desired triac switch.

Referring to FIG. 20, AC input filter 160 receives the AC input phase and neutral respectively, on terminals 42 and 44. Varistors RV4, RV5 and RV6 provide surge protection in the transverse and common mode to meet standard IEEE- 587. Substantially this protects against 200 amps short circuit, 6,000 volts at 100 kilohertz transient spikes. In conjunction therewith, capacitor FC7, common mode choke L1, capacitor FC4, resistor FR1 and capacitors FC5 and FC6 provide electromagnetic interference/radio frequency interference filter. Varistors RV1, RV3 and RV2 complete the line filter to clamp the output against possible resonant transients. The Filtered AC Line-L signal then appears on lead 80 while the Filtered AC Line-N signal appears on lead 82.

Figure 23:
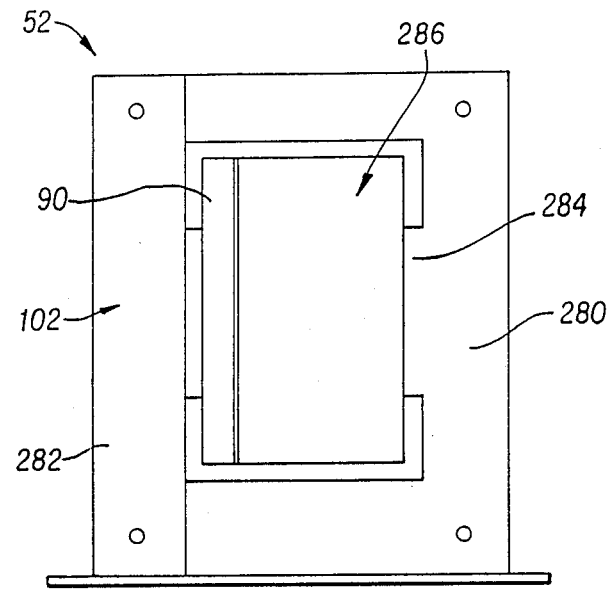
FIG. 23 is an idealized end view of the transformer represented in FIG. I and 3.

Referring to FIG. 23, transformer 52 comprises an iron core 102 formed of E-shaped laminations 280 and I-shaped laminations 282. A center leg 284 of the core carries the windings comprising the tightly coupled windings 286, to be described, and the second primary winding 90 in side-by-side relationship. This side-by-side relationship results in a loose coupling between the tightly coupled windings 286 and the second primary winding 90 to obtain the transformer characteristics previously described.

Figure 24:
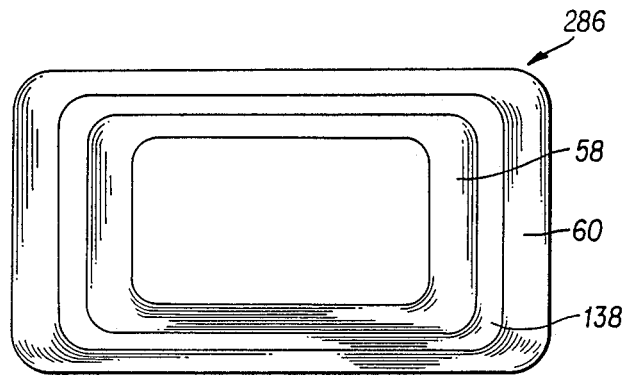
FIG. 24 is an idealized elevational view of the concentric windings used on the transformer of FIG. 23.

Also referring to FIG. 24, the tightly coupled windings 286, shown free from the iron core and in end elevation, comprise the first primary winding 58 at the innermost portion thereof, the secondary winding 60 at the outermost portion thereof and the charger secondary winding 138 sandwiched therebetween. This overlapping or concentric winding of the first primary winding 58 and the secondary windings 60 results in a tight coupling of the magnetic fields thereof such as occurs in a power transformer or an isolation transformer.

The closely coupled windings 286 form a central opening substantially 4.45 inches high and 2.53 inches wide and are about 2.5 inches thick. The second primary winding 90 has the same dimensions but is about 0.54 inch thick.

Referring back to FIG. 1, first primary winding 58 comprises 63 turns of nine gauge square wire with taps 72, 74, 76 and 78 respectively occurring at 47, 52, 57 and 63 turns. Secondary winding 60 comprises 56 turns of nine gauge square wire. Charger winding 138 comprises 19 turns of nine gauge square wire and second primary winding 90 comprises eight turns of two by eight twin bifilar wound.

The UPS device 40 of the invention thus acts as a continuous supply of AC electrical power, within certain narrow voltage limits, to a load sensitive to voltage changes even slightly beyond those certain narrow voltage limits. The device 40, through regulator 50, acts to shift voltage variations in the AC input source, which may be +/− 20% of rated input voltage to within certain narrow limits at the output. This keeps the UPS device 40 in the normal mode, transmitting power from the AC input to the load, during AC input voltage variations. Upon substantial interruption of the AC input power, such as large or great voltage variations which would result in variations beyond the certain narrow limits at the output or a total loss of power, the UPS device forward transfers to supply the load with electrical power from the battery through the inverter and to disconnect the AC input from the load.

The uninterruptible power supply device 40 of the invention described furnishes superior transmission of AC input electrical power to the load and standby supply of electrical power to the load. The values of the components can be as desired and may be as indicated in the drawing figures. The waveforms depicted in the timing diagrams represent idealized conditions that facilitate explaining and understanding the invention. Some of the depicted waveforms also include portions uncompressed in time to avoid unnecessary repetition of other regular waveforms. One example of the compression of one portion of one waveform occurs in FIG. 31(b), waveform TP2, where the compression is indicated by a double arrowheaded line and a statement of the time it represents. This avoids presenting three full cycles of the other regular, periodic waveforms while clearly explaining the feature. Modifications of the specific embodiments of the inventions disclosed herein can be made as desired by varying the values of the components and the circuit configurations disclosed while remaining within the spirit of the inventions described in the appended claims. Further, alternative and equivalent components can be used to effect the same procedures for processing the signals to obtain like effects and benefits while remaining within the scope of the claims.

We claim:

1. In an uninterruptible power supply for transmitting voltage varying and interruptible AC electrical power received from a AC input source to a load through a transformer during availability of said power from said AC input source and supplying said load with AC electrical power through said transformer from an auxiliary source during interruption of power from said AC input source, a circuit for transferring between sensing the voltage of said electrical power transmitted to said load and sensing the voltage of said received electrical power while supplying said load with AC electrical power, said circuit comprising;
   A. AC input terminals to be connected to receive said AC input source of AC electrical power;
   B. load terminals to be connected to said load;
   C. switch means connected to said AC input terminals and load terminals for selecting an AC sample signal from one of said AC electrical power received at said AC input terminals and said AC electrical power transmitted to said load terminals, said selection respectively occurring in response to receipt of a switch signal of a standby state or a normal state;
   D. monitor means receiving said AC sample signal and producing a transfer signal of a normal state while the voltage of said AC sample signal continues between certain voltage limits indicating availability of said AC input source AC electrical power and producing a transfer signal of a standby state when the voltage of said A sample signal exceeds said certain voltage limits indicating interruption of said AC input source of AC electrical power; and
   E. sequence control means for producing said switch signal of said normal state to select passing said AC sample signal from said load terminals while said transfer signal continues in said normal state and for producing said switch signal of said standby state to select passing said AC sample signal from said AC input terminals while said transfer signal continues in said standby state.

2. The transfer circuit of claim 1 in which said switch means include two switches, one connected to said AC input terminals and a common lead and the other connected to said load terminals and said common lead, each switch receiving said switch signal, said other switch becoming conductive during said switch signal normal state and said one switch becoming conductive during said switch signal standby state.

3. The transfer circuit of claim 1 in which said uninterruptible power supply includes a regulator circuit selectively for connecting said transformer between said AC input and load terminals to transmit electrical power to said load terminals and for disconnecting said AC input terminals from said transformer while said standby source supplies electrical power to said load terminals respectively in response to receipt of a regulator enable signal of a normal state or a standby state and said auxiliary source supplying said load with electrical power and being disabled respectively in response to an auxiliary source enable signal of a standby state or a normal state, and in which said sequence control means produce said regulator enable signal and said auxiliary source enable signal.

4. The transfer circuit of claim 3 in which said sequence control means change said regulator enable signal from the normal to standby states before changing said auxiliary source enable signal from the normal to standby states.

5. The transfer circuit of claim 3 in which said sequence control means change said regulator enable signal from the standby to normal states before changing said auxiliary source enable signal from the standby to normal states.

6. In an uninterruptible power supply for transmitting voltage varying interruptible AC electrical power received from a AC input source to a load through a transformer during availability of said power from said AC input source and supplying said load with AC electrical power through said transformer from an auxiliary source during interruption of said power from said AC input source, a method of transferring between sensing the voltage of said electrical power transmitted to said load and sensing the voltage of said received electrical power while supplying said load with AC electrical power, said method comprising:
A. connecting AC input terminals to said AC input source and connecting load terminals to said load;
B. selecting an AC sample signal from one of said AC electrical power received at said AC input terminals and said AC electrical power transmitted to said load terminals, said selecting occurring respectively in response to receipt of a switch signal of a standby state or a normal state;
C. producing a transfer signal of a normal state while the voltage of said AC sample signal continues between certain voltage limits indicating availability of said AC input source AC electrical power and producing a transfer signal of a standby state when the voltage of said AC sample signal exceeds said certain voltage limits indicating interruption of said AC input source of AC electrical power; and
D. producing said switch signal of said normal state to select passing said AC sample signal from said load terminals while said transfer signal continues in said one normal and producing said switch signal of said standby state to select passing said AC sample signal from said AC input terminals while said transfer signal continues in said standby state.

7. The method of claim 6 in which said selecting an AC sample signal includes connecting one switch between said AC input terminals and a common lead that carries said AC sample signal and connecting another switch between said load terminals and said common lead, applying said switch signal to each switch, rendering said other switch conductive during said switch signal normal state and rendering said one switch conductive during said switch signal standby state.

8. The method of claim 6 in which said uninterruptible power supply includes a regulator circuit selectively for connecting said transformer between said AC input and load terminals to transmit electrical power to said load terminals and for disconnecting said AC input terminals from said transformer while said standby source supplies electrical power to said load terminals respectively in response to receipt of regulator signal of a normal state or a standby state and said auxiliary source supplying said load with electrical power and being disabled respectively in response to an auxiliary source enable signal of a standby state or a normal state, and in which said producing said switch signal includes producing said regulator enable signal and said auxiliary source enable signal.

9. The method of claim 8 including changing said regulator enable signal from the normal to standby states before changing said auxiliary source enable signal from the normal to standby states.

10. The method of claim 8 including changing said regulator enable signal from the standby to normal states before changing said auxiliary source enable signal from the standby to normal states.

11. In an uninterruptible power supply for transmitting interruptible AC electrical power from AC input terminals to load terminals through a transformer during availability of said power from said AC input terminals and supplying said load terminals with AC electrical power through said transformer from an auxiliary source during interruption of said power from said AC input terminals, and said supply selecting an AC sample signal from said load terminals and from said AC input terminals, the voltage of which represents the availability of said interruptible AC electrical power, an AC voltage monitor for indicating the value of the voltage of said analog AC sample signal applied thereto relative to certain voltage limits, which define availability of said electrical power from said AC input terminals, said monitor comprising:
A. high threshold means for producing an analog AC high voltage limit signal in phase with said AC sample signal, said AC high voltage limit signal attaining a maximum absolute voltage of said ceratin limits;
B. low threshold means for producing an AC analog low voltage limit signal in phase with said AC sample signal, said AC low voltage limit signal attaining a minimum absolute voltage of said certain limits;
C. voltage comparator means for producing at least one voltage comparator signal that continues in phase with said AC sample signal while the voltage of said AC sample signal continues between said AC high and low voltage limit signals, and that goes out of phase with said AC sample signal when the voltage of said AC sample signal exceeds one of said AC high and low voltage limit signals; and
D. phase comparator means for producing a transfer signal of a normal state while said voltage comparator signal continues in phase with said AC sample signal and a transfer signal of a standby state when said voltage comparator signal goes out of phase with said AC sample signal, said transfer signal of said normal state indicating that said AC sample signal continues within said certain voltage limits and said transfer signal of said standby state indicating that said AC sample signal exceeds said certain voltage limits.

12. The monitor of claim 11 in which said high and low voltage threshold means include resistor voltage divider arrays with variable resistors, and said threshold means receive a precision sine wave signal produced by said supply and pass same through said arrays to produce said limit signals.

13. The monitor of claim 11 including zero dead-band means receiving a precision sine wave signal, having substantially a sinusoidal wave form, produced by said supply, said zero dead-band means for modulating said precision sine wave signal to flatten the zero crossing portions of said sinusoidal wave form.

14. The monitor of claim 13 in which said high and low voltage threshold means include resistor voltage divider arrays with variable resistors and said threshold means receive said zero dead-band precision sine wave signal modulated by said zero dead-band means and pass same through said arrays to produce said limit signals.

15. The monitor of claim 14 in which there are two sets of resistor arrays for each threshold means, the first set for producing a normal voltage limit signal while said supply transmits electrical power to said load and the second set for producing a standby voltage limit signal while said supply supplies electrical power to said load.

16. The monitor of claim 11 in which said voltage comparator means include a pair of analog comparators, the first comparator receiving said high voltage limit signal and said AC sample signal to produce a high voltage comparator signal and the second comparator receiving said low voltage limit signal and said AC sample signal to produce a low voltage comparator signal.

17. The monitor of claim 11 in which said phase comparator means include a pair of digital gates each receiving from said supply a squared precision sine wave signal that stays in phase with said AC sample signal, the first gate also receiving a high voltage comparator signal to produce a high phase comparison signal indicating the phase relationship of its two received signals and the second gate also receiving a low voltage comparator signal to produce a low phase comparison signal indicating the phase relationship of its two received signals.

18. The monitor of claim 11 in which said phase comparator means include timing means for delaying producing a transfer signal after a change in the phase relationship between said voltage comparator signal and said AC sample signal.

19. The monitor of claim 18 in which said timing means include two timing circuits providing two different delay periods for delaying producing a transfer signal, one for a change in said AC sample signal exceeding said high voltage limit signal to change the phase of said voltage comparator signal and the other for a change in said AC sample signal exceeding said low voltage limit signal to change the phase of said voltage comparator signal.

20. The monitor of claim 11 including clipping detector means for inhibiting producing said transfer signal upon occurrence of a clipped AC sample signal otherwise exceeding said low voltage limit signal.

21. In an uninterruptible AC power supply for transmitting interruptible AC electrical power from AC input terminals to load terminals through a transformer during availability of said power from said AC input terminals and supplying said load terminals with AC electrical power through said transformer from an auxiliary source during interruption of said power from said AC input terminals, and said supply selecting an AC sample signal from said load terminals and from said AC input terminals, the voltage of which represents availability of said AC electrical power, a method for indicating the value of the voltage of said AC sample signal applied thereto relative to certain voltage limits, which define availability of said electrical power from said AC input terminals, said method comprising:

A. producing an analog AC high voltage limit voltage signal in phase with said AC sample signal, said AC high voltage signal attaining a maximum absolute voltage of said certain voltage limits;

B. producing an analog AC low voltage limit signal in phase with said AC sample signal, said AC low voltage limit signal attaining a minimum absolute voltage of said certain voltage limits;

C. producing at least one voltage comparator signal that continues in phase with said AC sample signal while the voltage of said AC sample signal continues between said AC high and low voltage limit signals, and that goes out of phase with said AC sample signal when the voltage of said AC sample signal exceeds one of said AC high and low voltage limit signals; and D. producing a transfer signal of a normal state while said voltage comparator signal continues in phase with said AC sample signal and a transfer signal of a standby state when said voltage comparator signal goes out of phase with said AC sample signal, said transfer signal of said normal state indicating that said AC sample signal continues within said certain voltage limits and said transfer signal of said standby state indicating that said AC sample signal exceeds said certain voltage limits.

22. The method of claim 21 in which said producing said high and low voltage limit signals includes passing a precision sine wave signal from said supply through voltage divider arrays having variable resistors.

23. The method of claim 21 including modulating a precision sine wave signal from said supply to flatten the zero crossing portions of its sinusoidal wave form.

24. The method of claim 23 in which said producing said high and low voltage limit signals includes passing said zero dead-band precision sine wave signal through resistor voltage divider arrays having variable resistors.

25. The method of claim 24 in which said passing includes passing said zero dead-band precision sine wave signal through two sets of resistor arrays for each threshold means, the first set yielding a normal voltage limit signal while said supply transmits electrical power to said load and the second set yielding a standby voltage limit signal while said supply supplies electrical power to said load.

26. The method of claim 21 in which said producing at least one voltage comparator signal includes applying said high voltage limit signal and said AC sample signal to a first analog comparator to yield a high voltage comparator signal and applying said low voltage limit signal and said AC sample signal to a second comparator to yield a low voltage comparator signal.

27. The method of claim 21 in which said producing a transfer signal includes applying a squared precision sine wave signal that stays in phase with said AC sample signal from said supply to a pair of digital gates and also applying to the first gate a high voltage comparator signal to yield a high phase comparison signal indicating the phase relationship of its two received signals and also applying to the second gate a low voltage comparator signal to yield a low phase comparison signal indicating the phase relationship of its two received signals.

28. The method of claim 21 in which said producing a transfer signal includes delaying said producing a transfer signal after a change in the phase relationship between said voltage comparator signal and said AC sample signal.

29. The method of claim 28 in which said delaying includes providing two different delay periods, one for a change in said AC sample signal exceeding said high voltage limit signal and the changing of the phase of said voltage comparator signal and the other for a change in said AC sample signal exceeding said low voltage limit signal and the changing of the phase of said voltage comparator signal.

30. The method of claim 21 including inhibiting said producing said transfer signal upon occurrence of a clipped AC sample signal otherwise exceeding said low voltage limit signal.

31. In an uninterruptible power supply for transmitting interruptible AC electrical power from AC input terminals to load terminals through a transformer during availability of said power from said AC input terminals, and supplying said load terminals with AC electrical power through said transformer from a standby source during interruption of said power from said AC input terminals, the supply selecting an AC sample signal from said load and AC input terminals, the voltage of which represents availability of said electrical power, and said supply including a voltage monitor producing, in response to the voltage of said AC sample signal, a forward transfer signal for effecting forward transfer of said power supply from transmitting electrical power to said load terminal to supplying power to said load terminals, a detector circuit for inhibiting said forward transfer of said power supply upon detection of a clipping of the crests of said AC sample signal voltage wave form that otherwise appears to be a low voltage condition normally causing said forward transfer through said monitor producing said forward transfer signal, said detector circuit comprising:
  A. voltage comparator means receiving said AC sample signal voltage wave form and producing a clip detect signal having a width directly varying with the amount of clipping of the crests of said AC sample signal voltage wave form; and B. switch means in series with said monitor for disabling production of said forward transfer signal during said clip detect signal.

32. The detector circuit of claim 31 in which said voltage comparator means include in series connection, differentiator means for processing said AC sample signal to shift the phase thereof 90 degrees and dV/dT comparator means for making said clip detect signal in the periods during which said phase shifted AC sample signal passes through its fast dV/dT portions.

33. The detector circuit of claim 32 in which said dV/dT comparator means include a pair of voltage comparators connected in parallel to produce output signals when said phase shifted AC sample signal passes through the voltages associated with its zero crossing point.

34. The detector circuit of claim 31 in which said voltage comparator means include precision sine wave means enabling production of said clip detect signal for only a certain length of time centered at each crest of said AC sample signal voltage wave form.

35. The detector circuit of claim 31 in which said monitor includes a timer for delaying production of said transfer signal after recognition of an apparent low voltage condition, and said switch means include a switch connected to said timer for resetting said timer upon receipt of said clip detect signal.

36. The detector circuit of claim 31 including disable means for blocking said switch means from disabling said production of said forward transfer signal upon the voltage of said AC sample signal voltage wave form falling below a specified point regardless of any clipping.

37. In an uninterruptible power supply for transmitting interruptible AC electrical power from AC input terminals to load terminals through a transformer during availability of said power from said AC input terminals, and supplying said load terminals with AC electrical power through said transformer from a standby source during interruption of said power from said AC input terminals, the supply selecting an AC sample signal from said load and AC input terminals, the voltage of which represents availability of said electrical power, and said supply including a voltage monitor producing in response to the voltage of said AC sample signal, a forward transfer signal for effecting forward transfer of said power supply from transmitting power to said load terminals to supplying power to said load terminals, a method for inhibiting said forward transfer of said power supply upon detection of a clipping of the crests of said AC sample signal voltage wave form that otherwise appears to said monitor to be a low voltage condition normally causing said forward transfer through said monitor producing said forward transfer signal, said method comprising:
  A. producing a clip detect signal having width directly varying with the amount of clipping of the crests of said AC sample signal voltage wave form; and
  B. disabling production of said forward transfer signal during said clip detect signal.

38. The method of claim 37 in which said producing a clip detect signal includes processing said AC sample signal to shift the phase thereof 90 degrees and making said clip detect signal in the periods during which said phase shifted AC sample signal passes through its fast dV/dT portions.

39. The method of claim 37 in which said making said clip detect signal includes voltage sensing when said phase shifted AC sample signal passes through the voltages associated with its zero crossing point.

40. The method of claim 37 in which said producing a clip detect signal includes enabling production of said clip detect signal for only a certain length of time centered at each crest of said AC sample signal voltage wave form.

41. The method of claim 37 in which said monitor includes a timer for delaying production of said transfer signal after recognition of an apparent low voltage condition, and said disabling includes resetting said timer upon receipt of said clip detect signal.

42. The method of claim 37 including blocking said disabling of said production of said forward transfer signal upon the voltage of said AC sample signal voltage wave form falling below a specified point regardless of any clipping.

43. In an uninterruptible power supply for transmitting interruptible AC electrical power from AC input terminals to load terminals through a transformer during availability of said power from said AC input terminals, and supplying said load terminals with AC electrical power through said transformer from a standby source during interruption of said power from said AC input terminals, a phaselocked loop circuit for producing from an oscillator internal said power supply a precision sine wave signal in phase with the phase of the sinusoidal wave form of the AC electrical power, said oscillator being capable of varying the frequency of the precision sine wave signal from a desired frequency equal to that of the AC electrical power in response to the current level of a control signal fed to said oscillator varying from a certain current level, said loop circuit comprising:

A. phase shifter means receiving said sinusoidal wave form of said AC electrical power and producing a shifted signal having a phase 180 degrees from said sinusoidal wave form;
B. first divider means receiving said shifted signal and producing a first divided signal therefrom oscillating at a frequency of half that of said shifted signal;
C. second divider means receiving said precision sine wave signal and producing a second divided signal therefrom oscillating at a frequency of half that of said precision sine wave signal;
D. gating means receiving said first and second divided signals and producing a synchronizing signal having pulses with varying widths directly related to the phase difference between said first divided signal and said second divided signal; and
E. current generator means receiving said synchronizing signal and producing said control signal having current levels directly related to the varying widths of said pulses of said synchronizing signal,
F. so that a phase difference between said electrical power sinusoidal wave form and said precision sine wave signal causes said oscillator to vary the frequency of said precision sine wave signal until the phase of said precision sine wave signal matches that of said electrical power sinusoidal wave form.

44. The loop circuit of claim 43 in which said phase shifter means include a pair of analog comparators, the first receiving said electrical power sinusoidal wave form at an inverting input and the second receiving said precision sine wave signal at a non-inverting input.

45. The loop circuit of claim 43 in which said first and second divider means include, respectively, first and second flip flops receiving their respective signals at clock signal inputs.

46. The loop circuit of claim 43 in which said gating means include an exclusive-or gate receiving said first and second divided signals and producing said synchronizing signal.

47. The loop circuit of claim 43 in which said current generator means include an error amplifier receiving said synchronizing signal and producing said control signal.

48. In an uninterruptible power supply for transmitting interruptible AC electrical power from AC input terminals to load terminals through a transformer during availability of said power from said AC input terminals, and supplying said load terminals with AC electrical power through said transformer from a standby source during interruption of said power from said AC input terminals, a method of producing from an oscillator internal said power supply a precision sine wave in phase with the phase of the sinusoidal wave form of the AC electrical power, said oscillator being capable of varying the frequency of the precision sine wave signal from a desired frequency equal to that of the AC electrical power in response to the current level of a control signal fed to said oscillator varying from a certain current level, said method comprising:

A. producing a shifted signal having a phase 180 degrees from said sinusoidal wave form of said AC electrical power;
B. producing a first divided signal oscillating at a frequency of half that of said shifted signal;
C. producing a second divided signal oscillating at a frequency of half that of said precision sine wave signal;
D. producing a synchronizing signal having pulses with varying widths directly related to the phase difference between said first divided signal and said second divided signal; and
E. producing said control signal having current levels directly related to the varying widths of said pulses of said synchronizing signal,
F. so that a phase difference between said electrical power sinusoidal wave form and said precision sine wave signal causes said oscillator to vary the frequency of said precision sine wave signal until the phase of said precision sine wave signal matches that of said electrical power sinusoidal wave form.

49. The method of claim 48 in which producing said shifted signal includes shifting the phase of said electrical power sinusoidal wave form while maintaining constant the phase of said precision sine wave signal.

50. The method of claim 48 in which said producing first and second divided signals includes respectively clocking said shifted signal and precision sine wave signal through respective flip flops.

51. The method of claim 48 in which said producing a synchronizing signal includes applying the rules of an exclusive-or gate to said first and second divided signals to produce said synchronizing signal.

52. An uninterruptible power supply for transmitting voltage varying and interruptible AC electrical power received from a AC input source to a load during availability of electrical power from said AC input source and supplying said load with AC electrical power from an auxiliary source during interruption of power from said AC input source, said supply comprising:

A. AC input terminals adapted to be connected to said AC input source;
B. load terminals adapted to be connected to said load;
C. monitor means coupled to said AC input terminals and said load terminals for producing a normal mode signal when the AC electrical power from said AC input source continues within about certain voltage limits and for producing a standby mode signal when AC input source electrical power varies substantially beyond said certain voltage limits to be considered interrupted;
D. transformer means connected in series between said AC input and load terminals for transmitting AC electrical power from said AC input terminals to said load terminals;
E. inverter means for supplying AC electrical power to said load terminals through said transformer means upon receipt of an inverter enable signal;
F. regulator means connected in series with said transformer means between said AC input and load terminals for regulating, in response to a regulator enable signal, to within said certain voltage limits the AC electrical power transmitted to said load terminals from said AC input terminals in response to the AC voltage from said AC input terminals varying substantially at said certain voltage limits, and for disconnecting, in response to a regulator disable signal, said transformer means from said AC input terminals;

G. sequence means for producing said regulator enable signal and a switch normal signal in response to said normal mode signal and for producing said regulator disable signal, said inverter enable signal and a switch standby signal in response to said standby mode signal; and H. switch means for connecting said load terminals to said monitor means in response to said switch normal signal and for connecting said AC input terminals to said monitor means in response to said switch standby signal.

53. The supply of claim 52 in which said monitor means include phase shift detection means for determining whether the AC voltage at said terminals continues within said certain voltage limits to produce said normal and standby mode signals.

54. The supply of claim 52 in which said transformer means include two magnetic paths to said load terminals, a first closely coupled path from said AC input terminals to said load terminals and a second loosely coupled path from said inverter means to said load terminals.

55. The supply of claim 52 in which said transformer means include plural taps between said AC input and load terminals and said regulator means include plural tap switches for connecting said taps in series between said AC input and load terminals.

56. The supply of claim 52 in which said sequence means produce said regulator disable signal before producing said inverter enable signal and produce said regulator enable signal before removing said inverter enable signal.

57. The supply of claim 52 including synchronization means coupled to said AC input and load terminals for synchronizing the phase of said inverter means with said AC input source electrical power.

58. The supply of claim 57 in which said switch means also connect said AC input and load terminals to said synchronization means respectively in response to said switch normal and standby signals.

59. The supply of claim 57 in which said synchronization means include phase-locked loop means having a phase comparator portion operating at a fraction of the frequency of said AC input source electrical power.

60. A method of transmitting voltage varying and interruptible AC electrical power received form a AC input source to a load during availability of electrical power from said AC input source and supplying said load with AC electrical power from an auxiliary source during interruption of power from said AC input source, said method comprising:

A. connecting AC input terminals to said AC input source;

B. connecting load terminals adapted to said load;

C. producing a normal mode signal from a monitor when the AC electrical power from said AC input source continues within about certain voltage limits and producing a standby mode signal from said monitor when the AC electrical power form said AC input source varies substantially beyond said certain voltage limits to be considered interrupted;

D. connecting a transformer in series between said AC input and load terminals for transmitting AC electrical power from said AC input terminals to said load terminals;

E. supplying AC electrical power from an auxiliary source to said load terminals through said transformer upon receipt of an inverter enable signal;

F. connecting a regulator in series with said transformer between said AC input and load terminals for regulating, in response to a regulator enable signal, to within said certain voltage limits the AC electrical power transmitted to said load terminals from said AC input terminals in response to the AC voltage from said AC input terminals varying substantially at said certain voltage limit, and for disconnecting, in response to a regulator disable signal, said transformer from said AC input terminals;

G. producing said regulator enable signal and a switch normal signal in response to said normal mode signal and for producing said regulator disable signal, said inverter enable signal and a switch standby signal in response to said standby mode signal; and H. connecting said load terminals to said monitor in response to said switch normal signal and for connecting said AC input terminals to said monitor in response to said switch standby signal.

61. The method of claim 60 in which said producing said normal and standby mode signals includes phase shift detecting to determine whether the AC voltage at said terminal continues within said certain voltage limits to produce said normal and standby mode signals.

62. The method of claim 60 in which said connecting a transformer includes furnishing two magnetic paths to said load terminals, a first tightly coupled path from said AC input terminals to said load terminals and a second loosely coupled path from said inverter means to said load terminals.

63. The method of claim 60 in which connecting said transformer includes furnishing plural taps between said AC input and load terminals, said connecting a regulator includes furnishing plural tap switches and further including connecting said taps in series between said AC input and load terminals with said tap switches.

64. The method of claim 60 including producing said regulator disable signal before producing said inverter enable signal and producing said regulator enable signal before removing said inverter enable signal.

65. The method of claim 60 including synchronizing the phase of supplying AC electrical power with said AC input source electrical power.

66. The monitor of claim 65 in which said synchronizing occurs in response to the voltage at one of said AC input and load terminals respectively in response to said switch normal and standby signals.

67. The method of claim 65 in which said synchronizing includes operating a phase comparator at a fraction of the frequency of said AC input source electrical power.

68. An uninterruptible power supply for transmitting voltage varying and interruptible AC electrical power received from a AC input source to a load during availability of electrical power from said AC input source and supplying said load with AC electrical power from an auxiliary source during interruption of power from said AC input source, said supply comprising:

A. AC input terminals adapted to be connected to said AC input source;
B. load terminals adapted to be connected to said load;
C. monitor means coupled to said AC input terminals and said load terminals for producing a normal mode signal when the AC electrical power from said AC input source continues within about certain voltage limits and for producing a standby mode signal when said AC input source electrical power varies substantially beyond said certain voltage limits to be considered interrupted;
D. transformer means connected in series between said AC input and load terminals for transmitting AC electrical power from said AC input terminals to said load terminals;
E. inverter means for supplying AC electrical power to said load terminals through said transformer means upon receipt of an inverter enable signal;
F. regulator means connected in series with said transformer means between said AC input and load terminals for regulating, in response to a regulator enable signal, to within said certain voltage limits the AC electrical power transmitted to said load terminals from said AC input terminals in response to the AC voltage from said AC input terminals varying substantially at said certain voltage limit, and for disconnecting, in response to a regulator disable signal, said transformer means from said AC input terminals;
G. sequence means for producing said regulator enable signal and a switch normal signal in response to said normal mode signal and for producing said regulator disable signal, said inverter enable signal and a switch standby signal in response to said standby mode signal;,
H. switch means for connecting said load terminals to said monitor means in response to said switch normal signal and for connecting said AC input terminals to said monitor means in response to said switch standby signal;
I. clip detector means for inhibiting said monitor from making said standby mode signal upon detection of a clipping of the crests of the AC voltage wave form applied to said monitor from said switch means that otherwise appears to be a low voltage condition normally causing said monitor to produce said standby mode signal; and
J. phase-locked loop means for keeping said inverter means synchronized with the phase of said AC input source electrical power.

* * * * *